(12) United States Patent
Funatsu

(10) Patent No.: US 6,490,084 B2
(45) Date of Patent: Dec. 3, 2002

(54) BINOCULAR

(75) Inventor: Gouji Funatsu, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 23 days.

(21) Appl. No.: 09/799,616

(22) Filed: Mar. 7, 2001

(65) Prior Publication Data

US 2001/0028499 A1 Oct. 11, 2001

(30) Foreign Application Priority Data

Mar. 8, 2000 (JP) ........................................ 2000-063134

(51) Int. Cl.⁷ .............................................. G02B 23/00
(52) U.S. Cl. ....................... 359/410; 359/407; 359/414; 359/425
(58) Field of Search ................................. 359/399, 405, 359/409–416, 480–482, 694–706, 425–426

(56) References Cited

U.S. PATENT DOCUMENTS

| 5,231,535 A | * 7/1993 | Peters et al. ................. 359/414 |
| 5,235,458 A | * 8/1993 | Akagi et al. ................. 359/410 |
| 5,930,035 A | 7/1999 | Funatsu ....................... 359/417 |
| 6,014,253 A | 1/2000 | Funatsu ....................... 359/418 |
| 6,108,128 A | 8/2000 | Funatsu ....................... 359/407 |

* cited by examiner

Primary Examiner—Thong Nguyen
(74) Attorney, Agent, or Firm—Greenblum & Bernstein, P.L.C.

(57) ABSTRACT

A binocular includes a right and left lens barrels respectively having a right and left telescope optical systems. The right and left telescope optical systems include focus arrangement structures in which both eyepiece lenses are simultaneously moved the same distance with respect to each objective lenses. There are provided two diopter correction structures independently and separately in the right and left telescope optical systems. In one diopter correction structure, a left objective lens is adjusted with respect to a right objective lens to correct a diopter difference between the two telescope optical systems on a manufacture process. In the other diopter correction structure, the location of the right objective lens is adjusted along the optical axis direction on an usual operation by an observer.

9 Claims, 28 Drawing Sheets

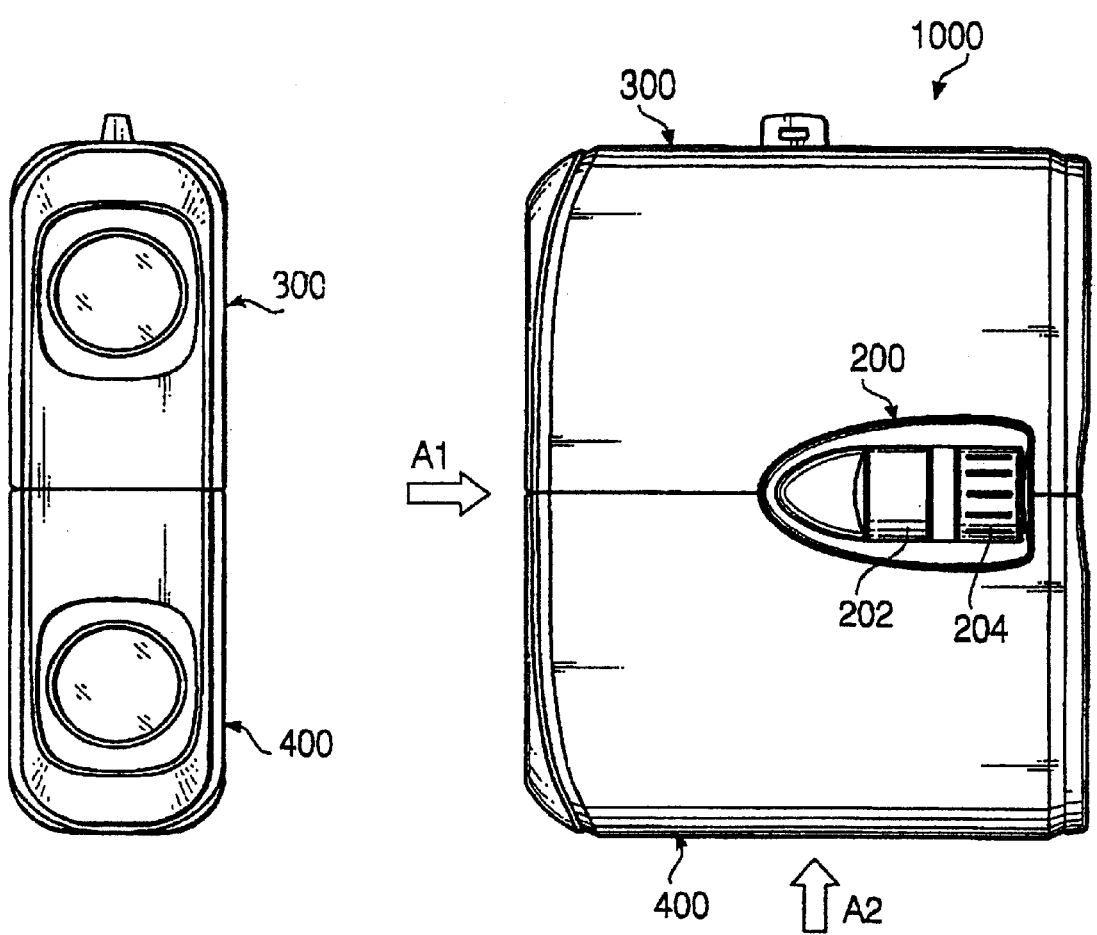
FIG. 1B
FIG. 1A
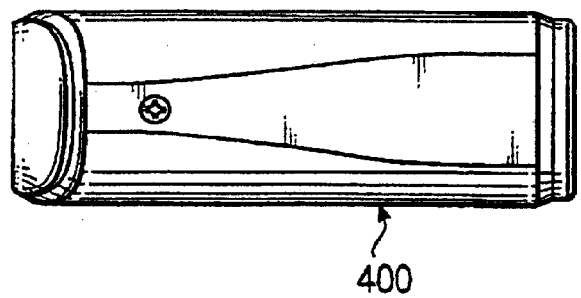
FIG. 1C

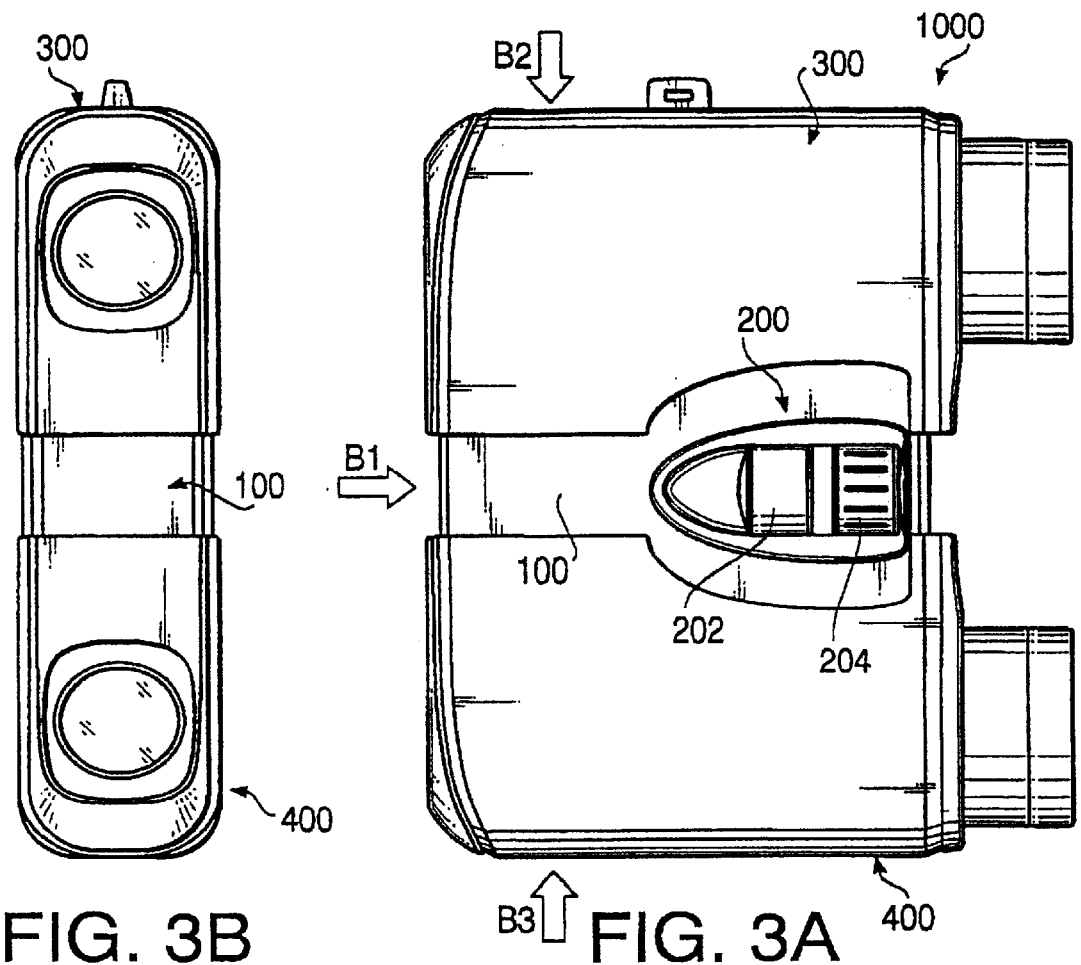
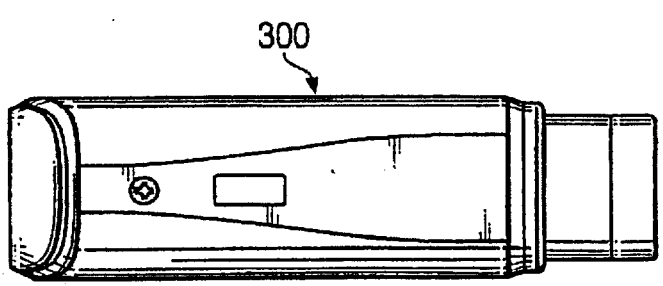
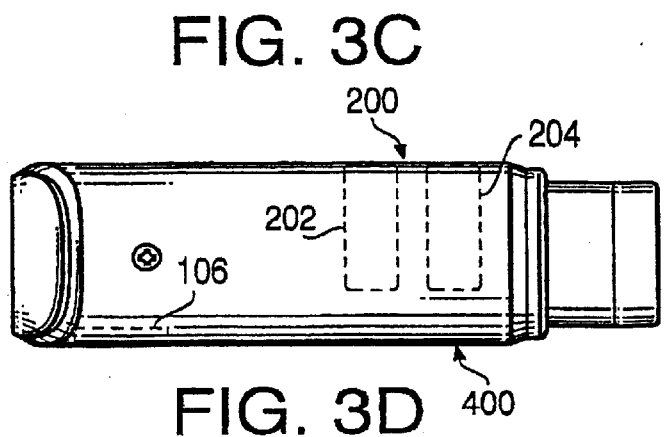

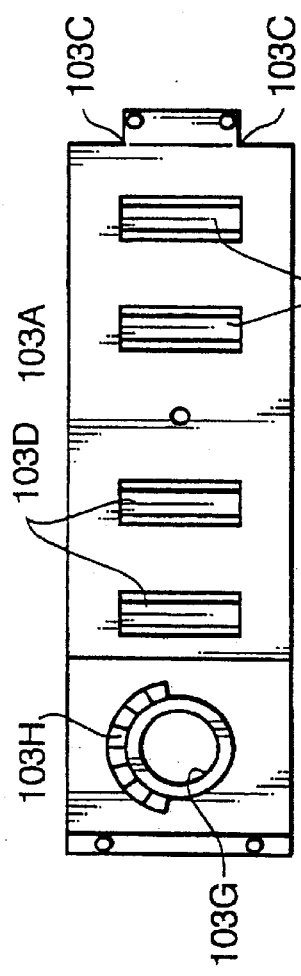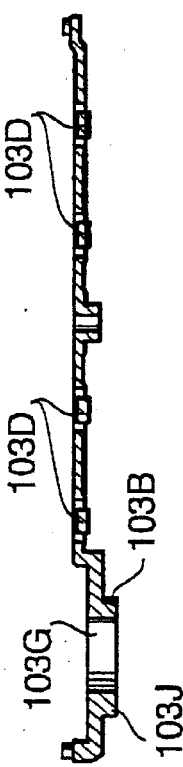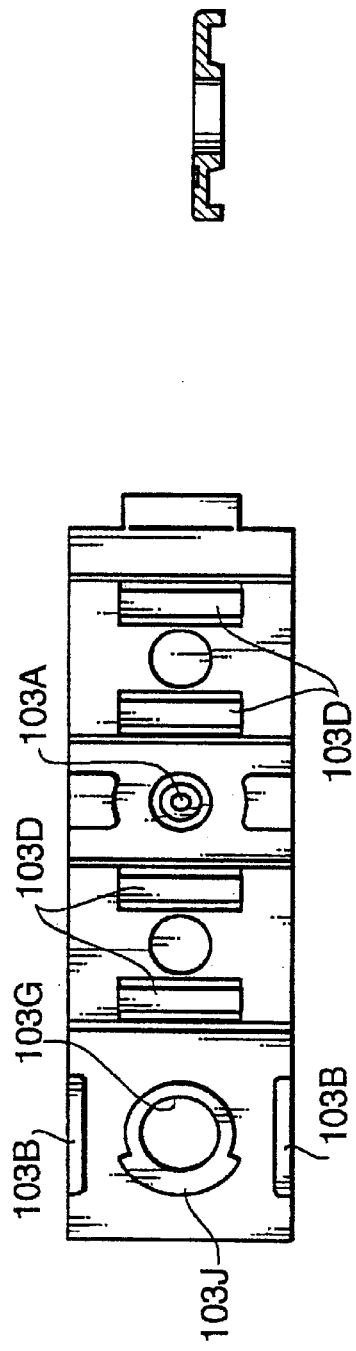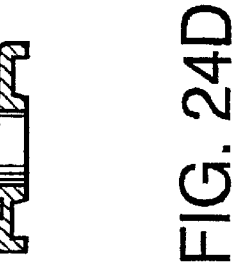

BINOCULAR

TITLE OF THE INVENTION

Binocular

BACKGROUND OF THE INVENTION

The present invention relates to a binocular, and more particularly, to a binocular including diopter correction mechanisms.

Conventionally, a binocular includes two telescope systems, left and right. Each telescope system has, respectively, a plurality of optical systems. The plurality of optical systems includes an objective optical system, an eyepiece optical system and other optical systems.

In a focusing process, some of the optical systems provided in the two telescope systems cooperate laterally, and are simultaneously moved along an optical axis. For example, the right and left eyepiece optical systems are made to approach to/move away from the respective objective optical systems.

On the other hand, a diopter correction, upon the usual (user-adjusted) operation, is performed by moving some part of the optical systems of only one of the two telescope systems along the optical axis. For example, one of the objective optical systems is moved along the optical axis to correct for diopter variation from left to right in a user's eyesight.

In such a binocular, the optical system for the diopter correction (in the above example, in the objective optical system) has additional correction length (the objective additionally movable along the optical axis) for the side upon which diopter correction is implemented(left or right) . Therefore, the optical system on one side, left or right, is longer than the other optical system by the additional correction length.

Moreover, fine adjustment of a diopter difference between left and right sides in a manufacturing process (before shipment of the binocular) requires still more movable length along the axis. Therefore, in the conventional binocular having such correction, the optical system for assembly-time or manufacturing diopter correction requires even more additional movable length than the adjustable length for the diopter correction on the usual (user adjusted) operation.

As mentioned above, if only one optical system has one diopter correction mechanism, the movable length necessary for diopter correction becomes longer, so that the size of the binocular can not be reduced.

SUMMARY OF THE INVENTION

It is therefore an object of the invention to reduce the size of a binocular by reducing a length of a telescope system along an optical axis direction.

A binocular according to the invention includes two parallel telescope optical systems, each of the two telescope optical systems having a plurality of optical systems in parallel to an optical axis. Each of the two telescope optical systems includes a first optical system in which a portion of the plurality of optical systems are moved along the optical axis for a diopter correction. Two diopter correction structures for the diopter correction are separately and independently provided in each of the two telescope optical systems by means of moving the first optical systems along the optical axis direction. Only one of the diopter correction structure includes a manually operable member exposed outward of an outer body housing of the binocular for the diopter correction.

Optionally, the first optical system of the other diopter correction structure is fixed to be unmovable along the optical axis after the diopter correction is finished.

Further, each of the two telescope optical systems may include a second optical system independent from the first optical system, which moves together with the first along the optical axis for focusing.

The first optical system may be an objective optical system, in which case the second optical system is an eyepiece optical system.

Still further optionally, the one of the diopter correction structures includes a first eccentric member integrally provided with a first shaft portion, and a first eccentric portion, eccentric to the first shaft portion. In this case, the first eccentric member may be rotatable about the axis of the first shaft portion, and engages with the first optical system. The first optical system is moved along the optical axis direction while engaging with the first eccentric member by the eccentric rotation of the first eccentric member about the axis of the first shaft portion. Optionally, the operable member includes the first eccentric member.

The other or second diopter correction structures may include a second eccentric member integrally provided with a second shaft portion, and a second eccentric portion, eccentric to the second shaft portion. In this case, the second eccentric member is rotatable about the axis of the second shaft portion, and is engaged with the other first optical system. The other first optical system is moved along the optical axis direction while engaging the second eccentric member, by the eccentric rotation of the second eccentric member about the axis of the second shaft portion.

Additionally, the binocular may include a supporting member, movably supporting the first optical system of the other telescope optical system along the optical axis direction. A shaft receiving hole is provided in the supporting member to rotatably support the second shaft portion, and the second eccentric member is rotated while the second shaft portion is supported in the shaft receiving hole.

The second shaft portion of the second eccentric member may be removable from the shaft receiving hole.

BRIEF DESCRIPTION OF THE ACCOMPANYING DRAWINGS

The present invention is further explained in the description which follows with reference to the drawings, illustrating, by way of non-limiting examples, various embodiments of the invention, with like reference numerals representing similar parts throughout the several views.

FIG. 1A shows a plan view of a binocular according to an embodiment of the invention, in which right and left lens barrels are in contact with each other, and right and left eyepiece barrels are contained inside a binocular body;

FIG. 1B shows a front view of the binocular of FIG. 1A seen from the direction of an arrow Al; and FIG. 1C shows a side view of the binocular of FIG. 1A seen from the direction of an arrow A2.

FIG. 3A shows an upper plan view of the binocular according to an embodiment of the invention, in which the right and left lens barrels are moved apart from each other as much as is permitted by the mechanisms described herein, and in which the right and left eyepiece lens barrels are drawn from the respective lens barrels by as much as is permitted by the mechanisms described herein;

FIG. 3B shows a front view of the configuration of FIG. 3A seen from the direction of arrow B1;

FIG. 3C shows a side view of the configuration of FIG. 3A seen from the direction of an arrow B2; and FIG. 3D shows a side view of the configuration of FIG. 3A seen from the direction of an arrow B3.

Figure 23:
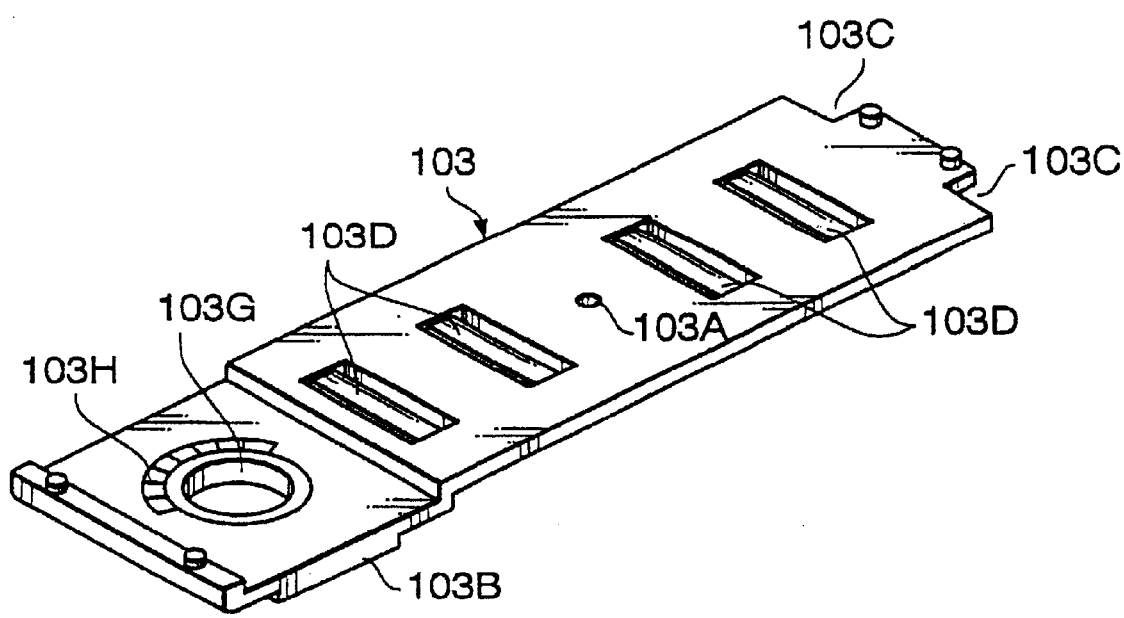
FIG. 23 is an enlarged perspective view of a bottom lid.

FIGS. 24A, 24B, and 24C are orthogonal views of the bottom lid of FIG. 23, showing top, side center section, and bottom views, respectively; and FIG. 24D shows four cross sections taken through FIG. 24B.

Figure 25A:
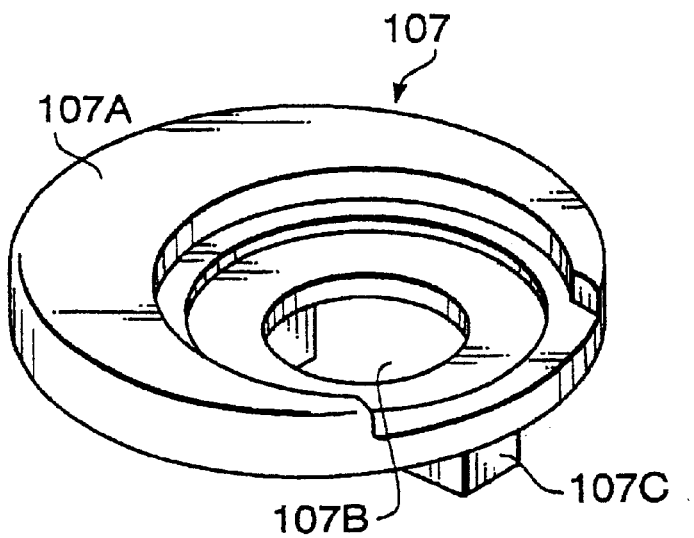
Figure 25B:
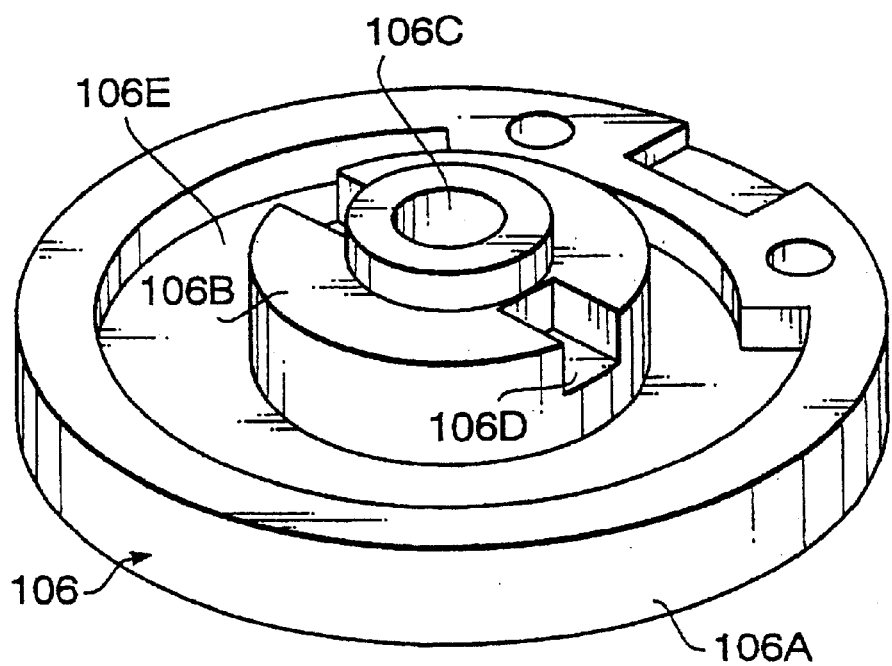

FIGS. 25A and 25B are perspective views of a diopter eccentric seat and diopter decorative ring, respectively.

Figure 26A:
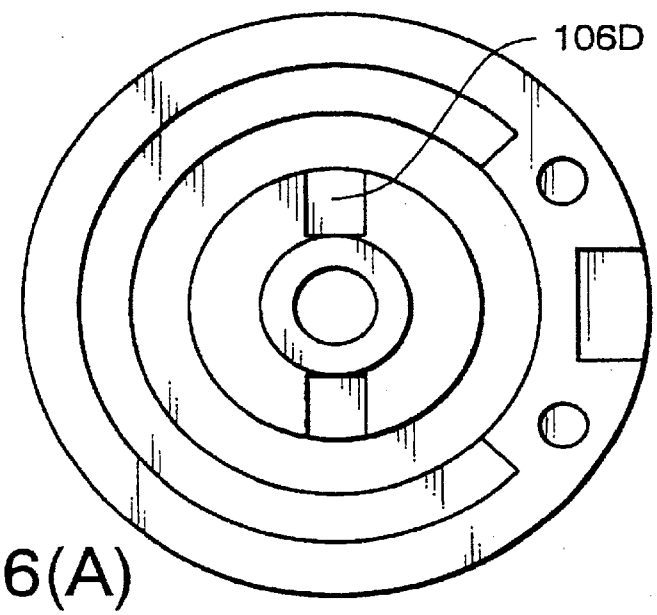
Figure 26B:
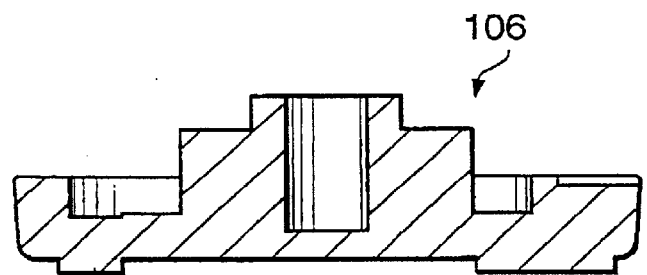
Figure 26C:
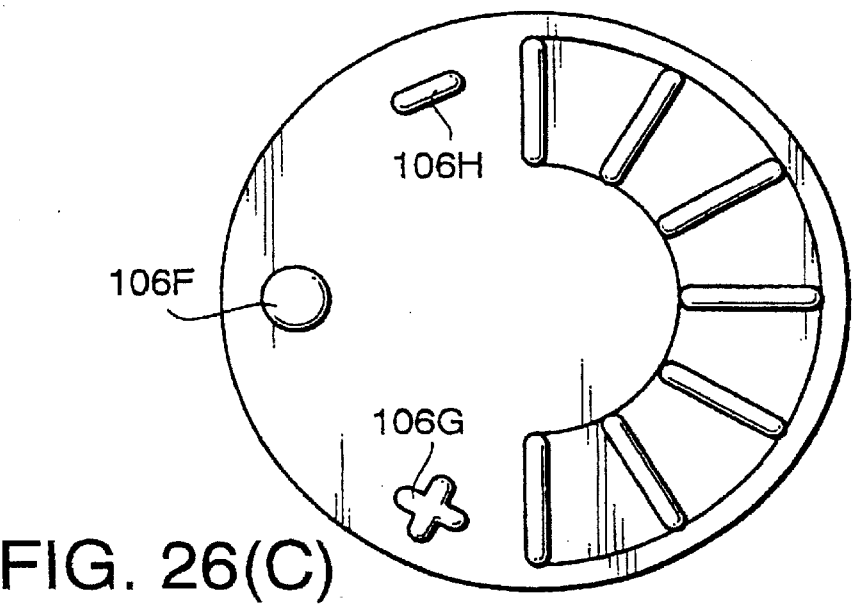

FIGS. 26A, 26B, and 26C are orthogonal views of the diopter decorative ring of FIG. 25B, showing top, side, and bottom views, respectively.

Figure 27A:
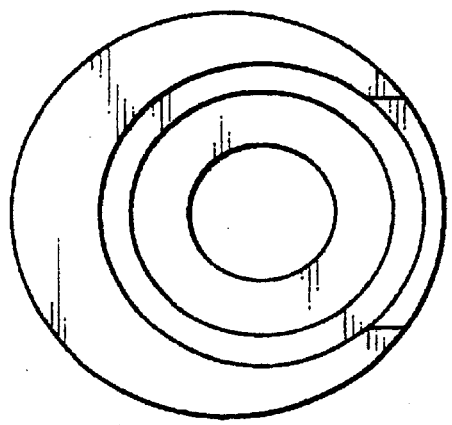
Figure 27B:
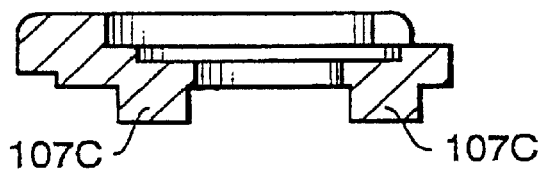
Figure 27C:
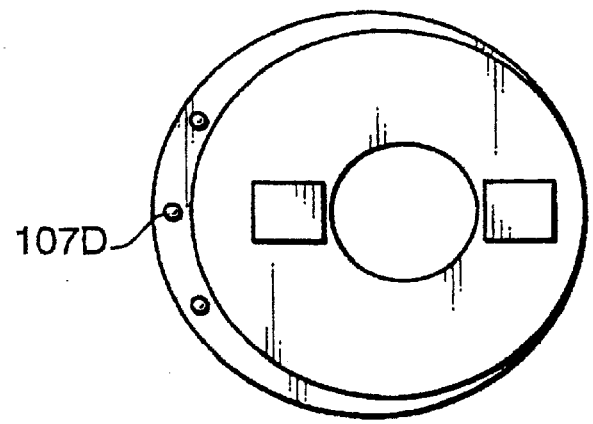

FIGS. 27A, 27B, and 27C are orthogonal views of the diopter eccentric seat of FIG. 25A, showing top, side, and bottom views, respectively.

Figure 11:
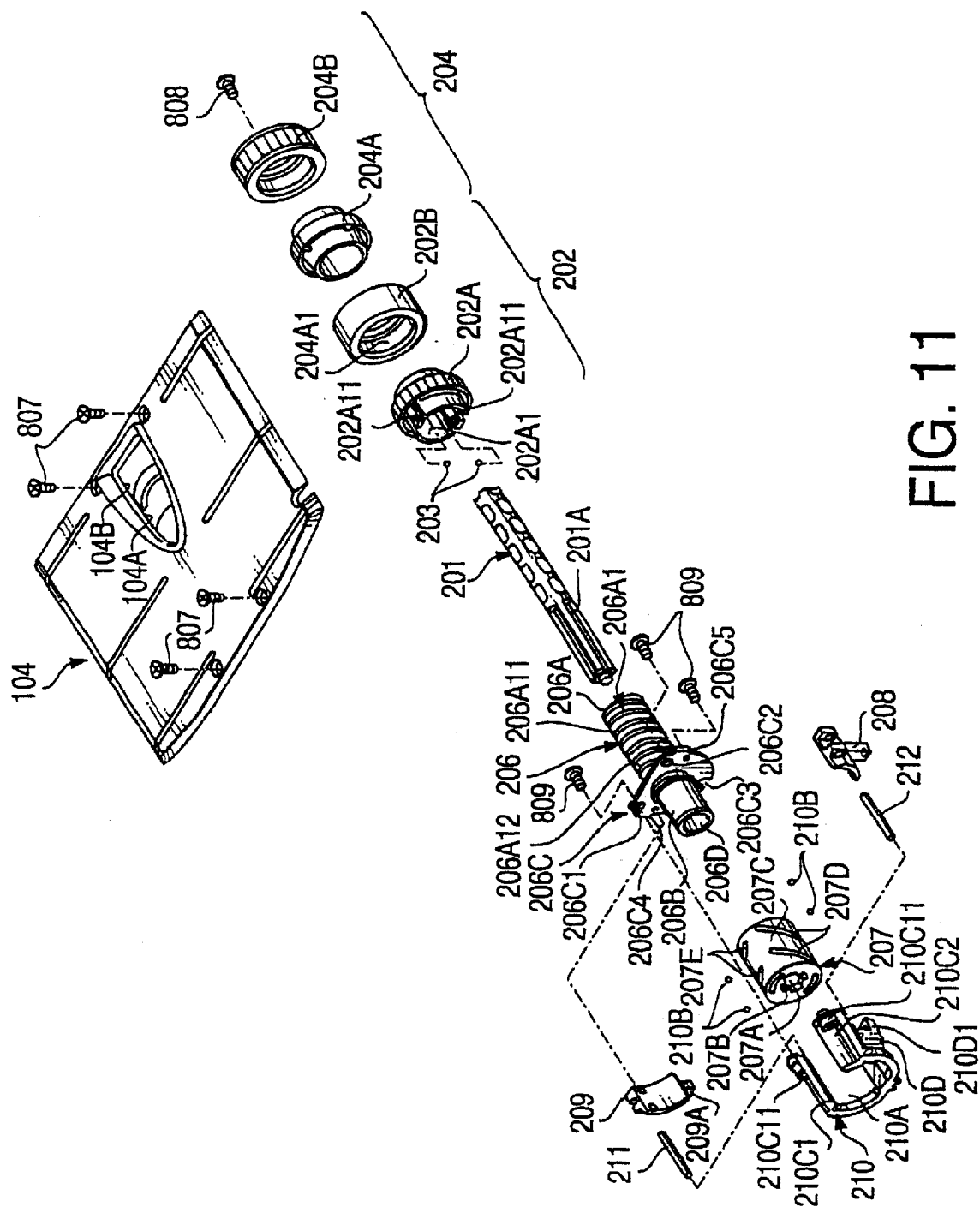
FIG. 11 shows an exploded perspective view, illustrating a structure of a portion of the optical operating unit and an upper plate shown in FIG. 7.
Figure 28A:
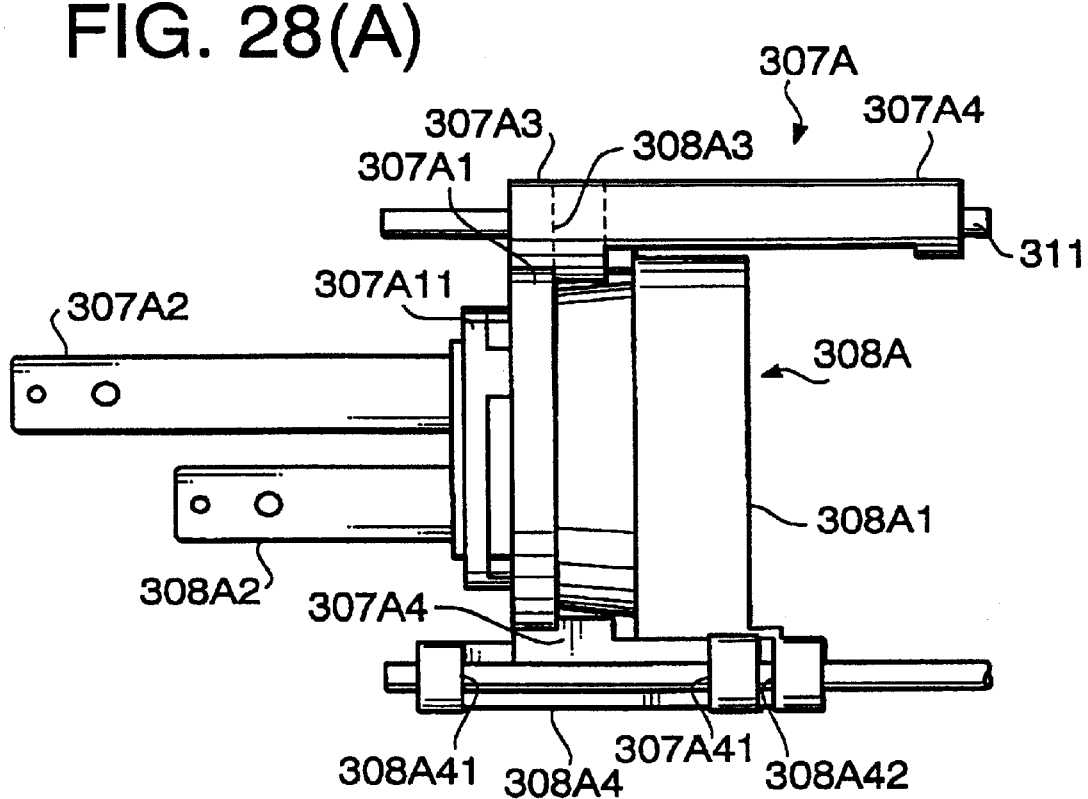

FIGS. 28A and 27B are 28B orthogonal views of the first and second lens frames of FIG. 11, showing top and front views, respectively.

DESCRIPTION OF THE EMBODIMENTS

Hereinafter, referring to the accompanying drawings, embodiments according to the present invention will be described.

In the description, an objective side along an optical axis is called a "front side", and an eyepiece side is called a "rear side". The terms "frontward" and "rearward" means respectively "toward the front side" and "toward the rear side". Right and left directions of the binocular are defined by the orientations mentioned above, that is, the right and left sides of the binocular as used herein corresponds to the sides that a user of the binocular would consider his or her right and left sides when operating the binocular. In general, as used herein, the "length" direction is front to back or vice versa, the "width" direction is left to right or vice versa, and the "height" direction is top to bottom or vice versa.

First, referring to FIGS. 1 and 2, an overview of the binocular will now be described.

A binocular 1000 includes a supporting unit 100 (see FIG. 3), an optical operating unit 200, the right lens barrel 300 and the left lens barrel.

The supporting unit 100 is provided between the right and left lens barrels (300, 400), for supporting the right and left lens barrels (300, 400). The right and left lens barrels (300, 400) have respective telescope optical systems therein.

There are provided, at the supporting unit 100, a diopter decorative ring 106 and an optical operating unit 200. The diopter decorative ring 106 (corresponding to a first eccentric member or a manually operable member in the claims) is provided on the bottom surface of the supporting unit 100, the surface of the diopter decorative ring 10 6 being exposed, i.e., facing outward . The optical operating unit 200 includes a focus arrangement ring 202 for arranging or adjusting focus of the binocular, and a zooming operation ring 204 for setting and adjusting magnifying-power of both of the right and left telescope optical systems.

The right and left lens barrels (300, 400) are supported by the supporting unit 100 therebetween, and are movable in the width direction of the binocular 1000, or the lateral direction. The right lens barrel 300 and the left lens barrel 400 cooperate to simultaneously move symmetrically to the center line of the supporting unit.

The right and left lens barrels (300, 400) include respectively a right moving unit 303 (shown in FIG. 5) and a left moving unit 403 (shown in FIG. 7), and respectively a right eyepiece cylinder 304 and a left eyepiece cylinder 404. The right moving unit 303 holds a right eyepiece lens unit 309 and a right erecting prism unit 306. The left moving unit 403 holds a left eyepiece lens unit 409 and a left erecting prism unit 406.

If the focus arrangement ring 202 is rotated, the right and left moving unit (303, 304) and the right and left eyepiece cylinder (304, 404) are moved for focus arrangement.

If the zooming operation ring 204 is rotated, some pieces of the optical structure, included both in the right and left lens barrel (300, 400) and as described herein, are moved along the optical axis for varying the magnifying-power.

The focus arrangement ring 202 and the zooming arrangement ring 204 are disposed near to the rear end (i. e. near to the eyepiece cylinder) of the binocular 1000 along the center line. The focus arrangement ring 202 and the zooming arrangement ring 204 are coaxial and adjacent to one another, in this order from the front end, and are each rotatable about an axis parallel to the optical axes. The focus arrangement ring 202 and the zooming arrangement ring 204 are disposed facing outward from the upper surface of the supporting unit 100.

Figure 18:
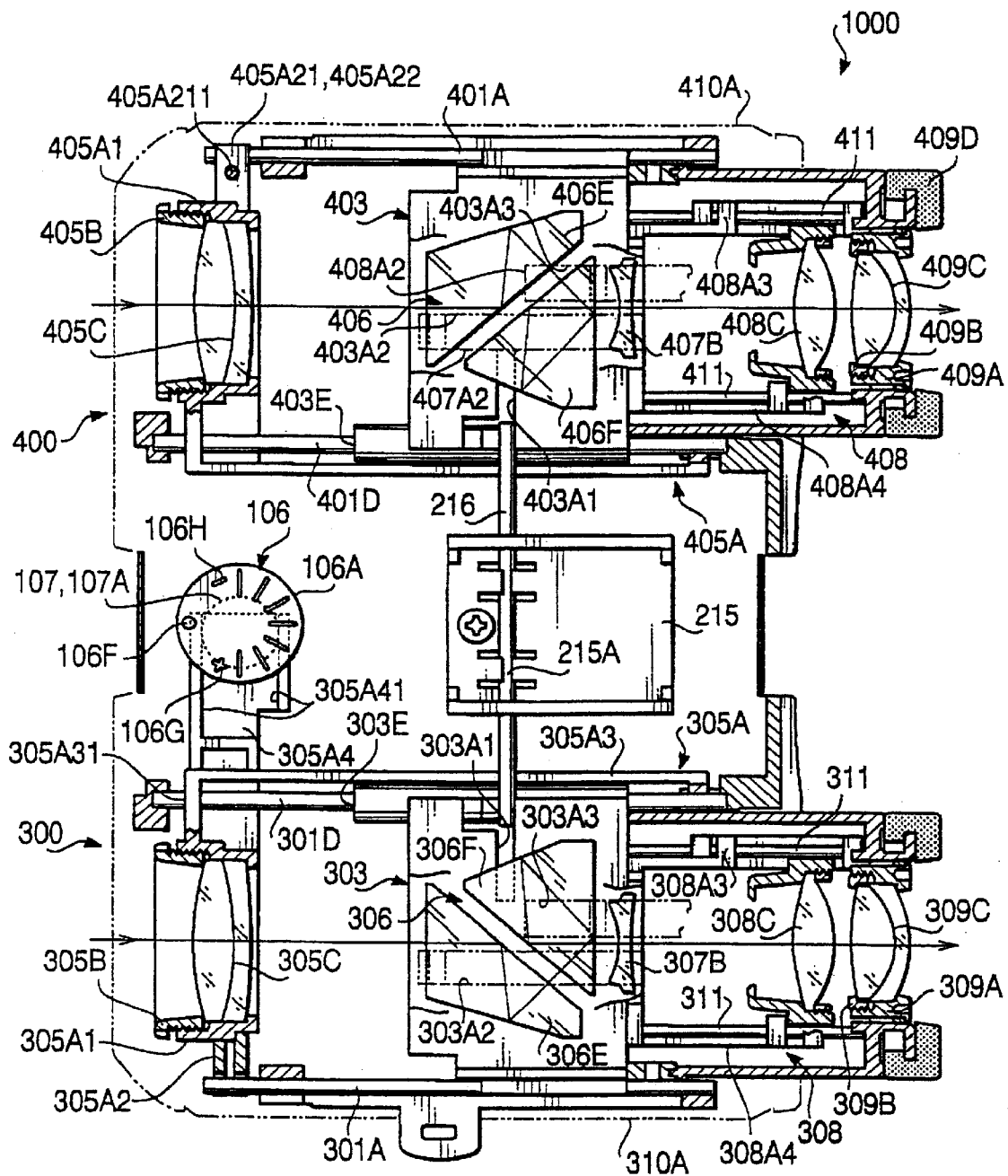
FIG. 18 shows a bottom view of the binocular, with a "zero point" mark of a diopter decorative ring being aligned with a reference mark.
Figure 19:
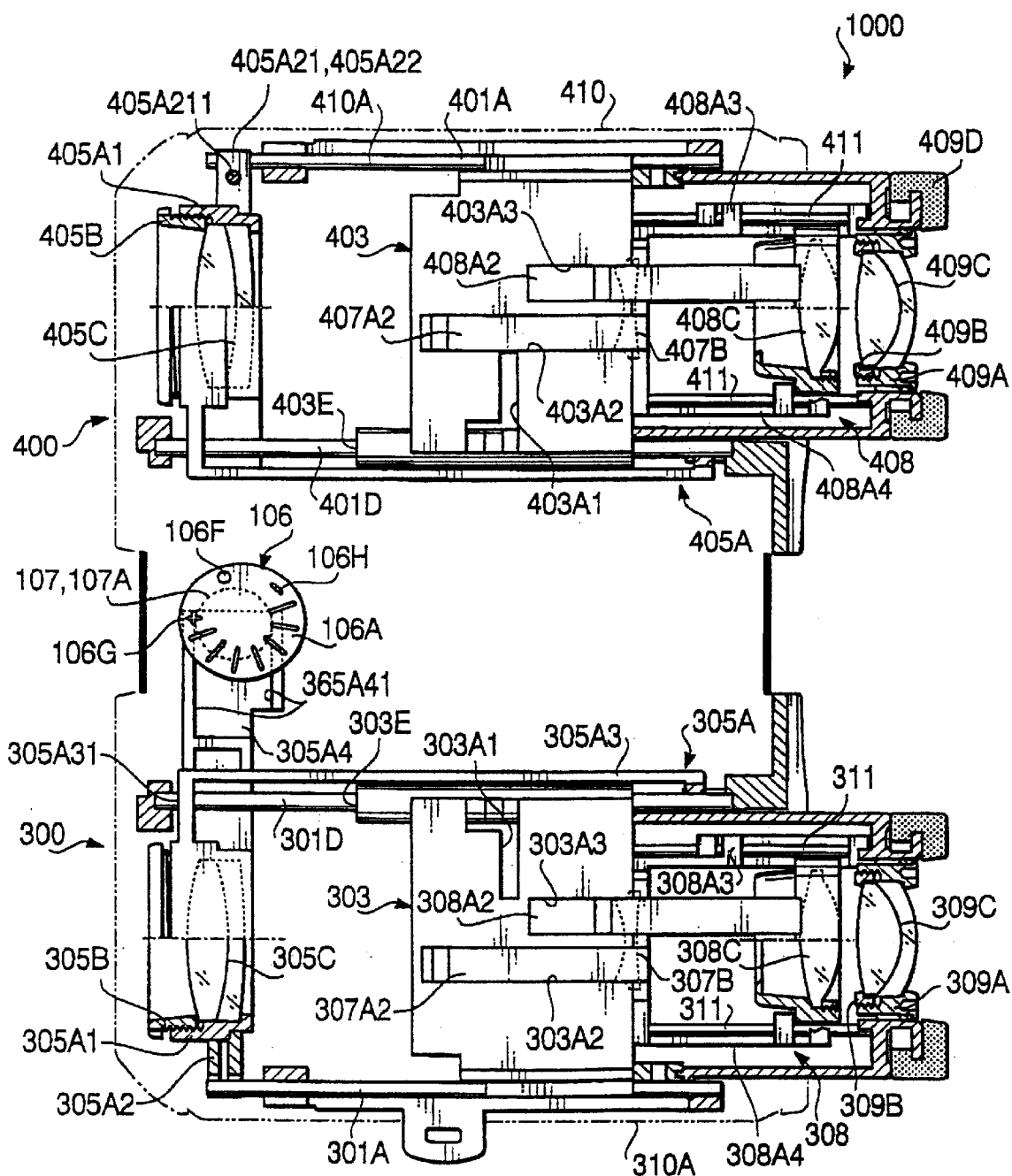
FIG. 19 shows a bottom view of the binocular with a positive "+" mark of the diopter decorative ring being aligned with the reference mark.
Figure 20:
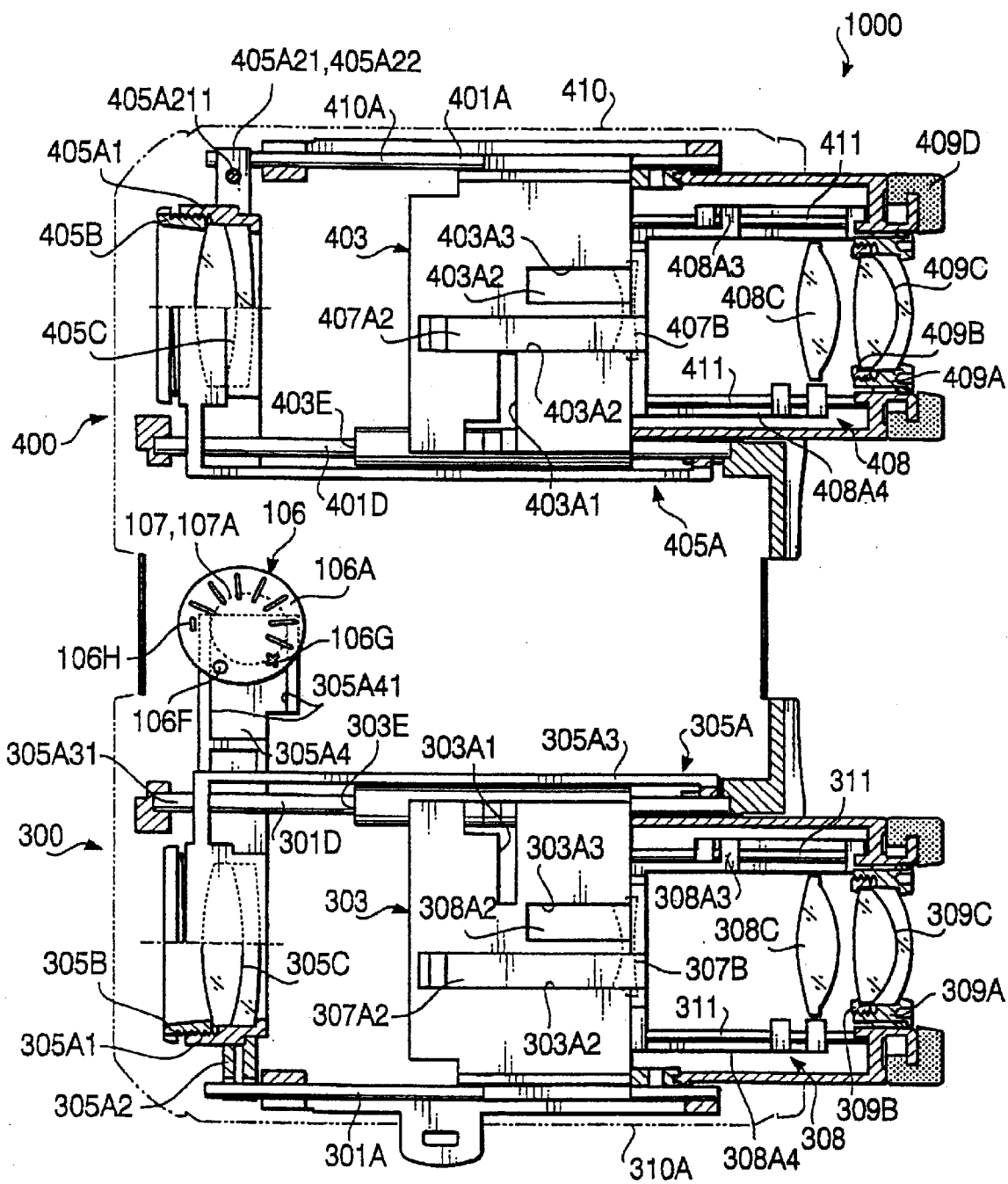
FIG. 20 shows a bottom plan view of the binocular with a negative "−" mark of the diopter decorative ring being aligned with the reference mark.

As shown in FIGS. 18 through 20, the diopter decorative ring 106 is disposed on the bottom front surface of the supporting unit 100 of the binocular 1000. The diopter decorative ring 106 is exposed, i.e., faces outward, from the bottom surface and is located along the center line mentioned above.

Therefore, when an observer or user holds the binocular, the right and left lens barrels are held by the operator's hands so that the diopter decorative ring 202 can be operated by fingers of either hand. Since the focus arrangement ring 202 and the zooming arrangement ring 204 are disposed on the center line, whichever hand can operate the rings more easily for more comfortable operation of the binocular may be used by the operator.

As shown in FIGS. 18 through 20, indicia including a "zero point" mark 106F, a "plus" mark 106G and a "minus" mark 106H are marked on the surface of the diopter decorative ring 106, which can be seen from the outside of the binocular by the operator. The "zero point"mark 106F, when aligned with a reference mark on the supporting unit 100, indicates no diopter difference (i. e. the zero point), and the "plus"/"minus" marks illustrates the direction of the diopter correction to be made, the "plus" and "minus" marks optionally indicating the end of the adjustment range.

In the following description, the structures of each operational unit of the binocular 1000 are described.

Figure 5:
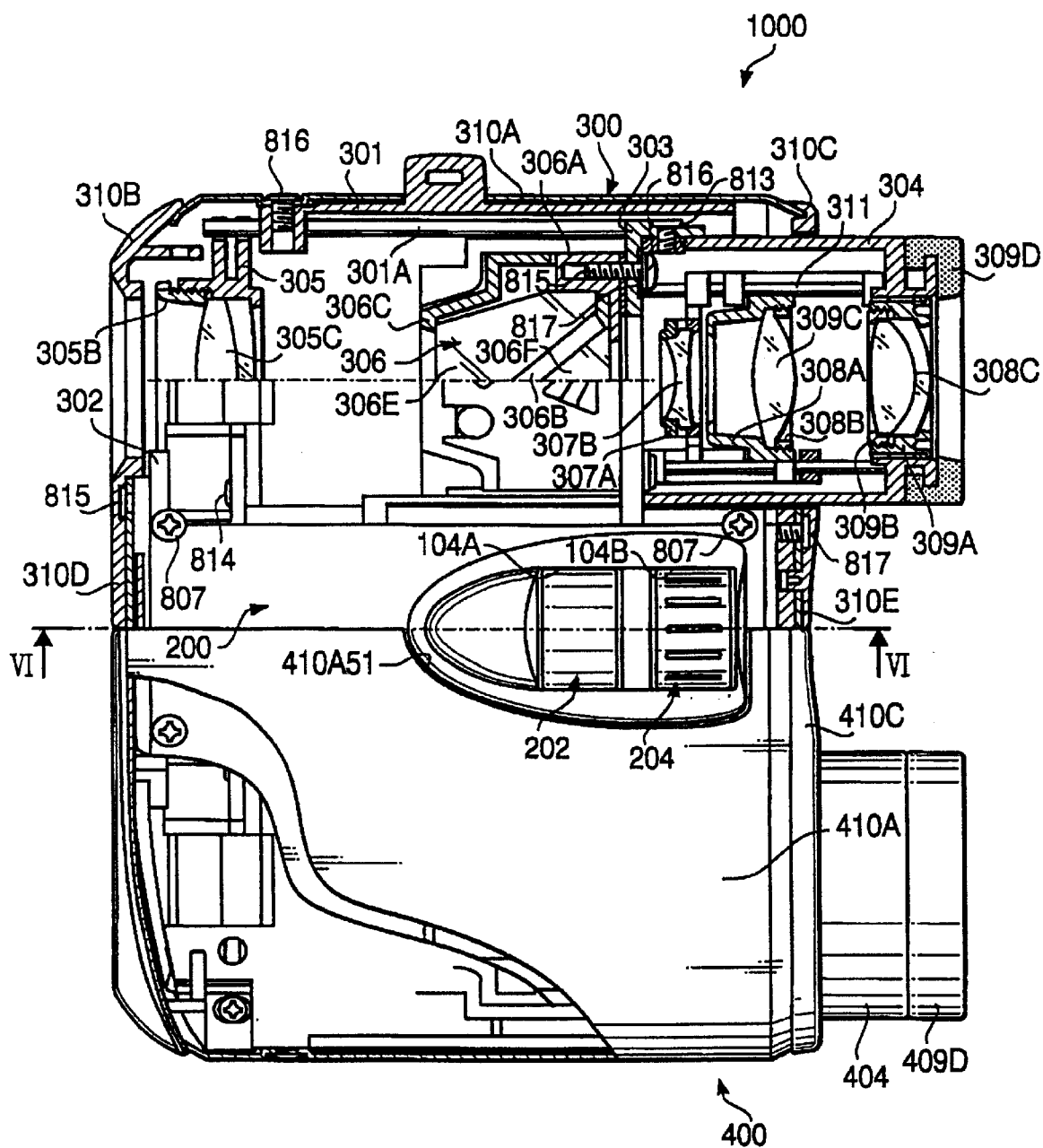
FIG. 5 shows a partially cross-sectional top plan view of the binocular.
Figure 6:
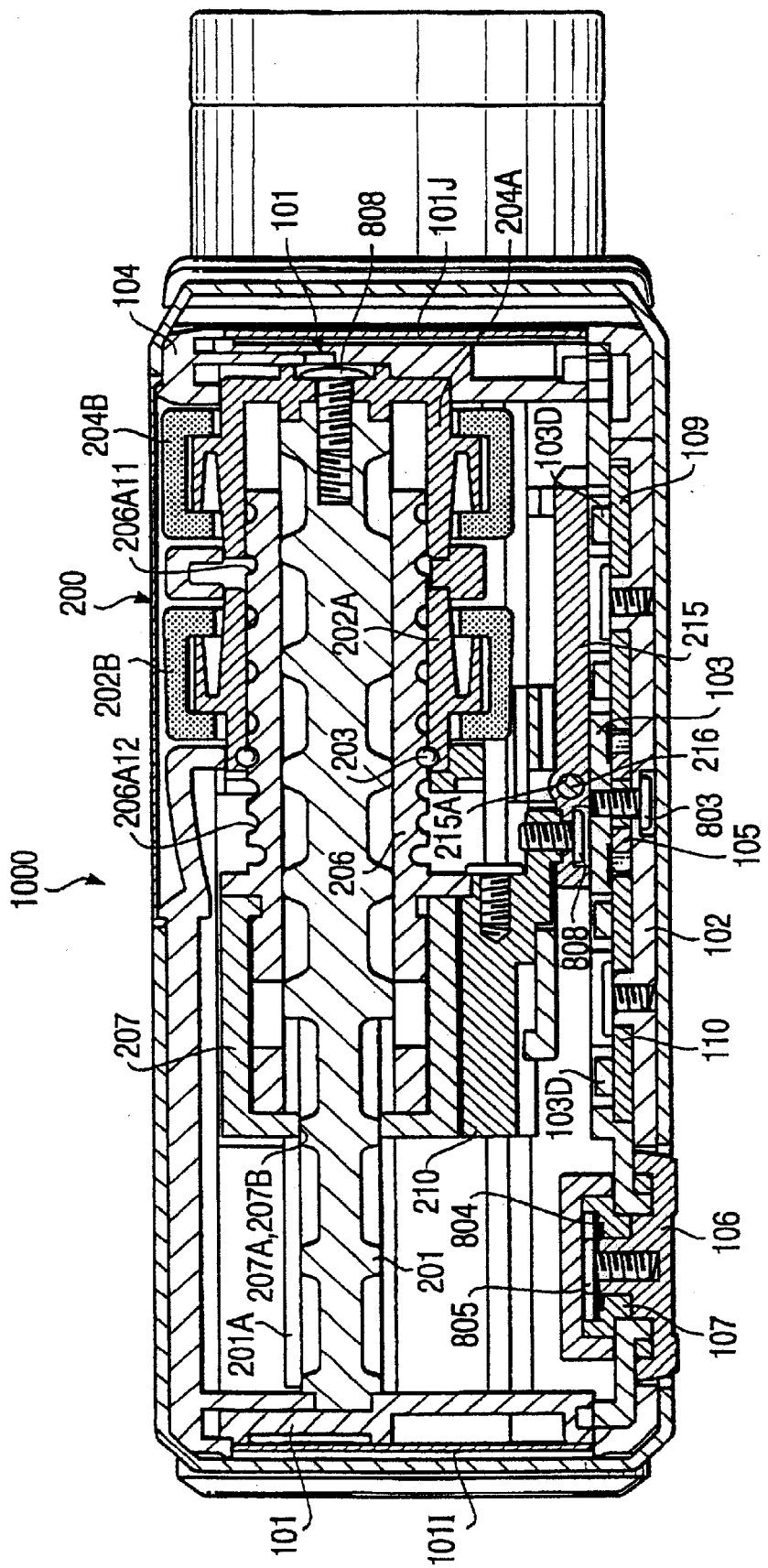
FIG. 6 shows a cross-sectional view of FIG. 5 taken along a line VI—VI.
Figure 7:
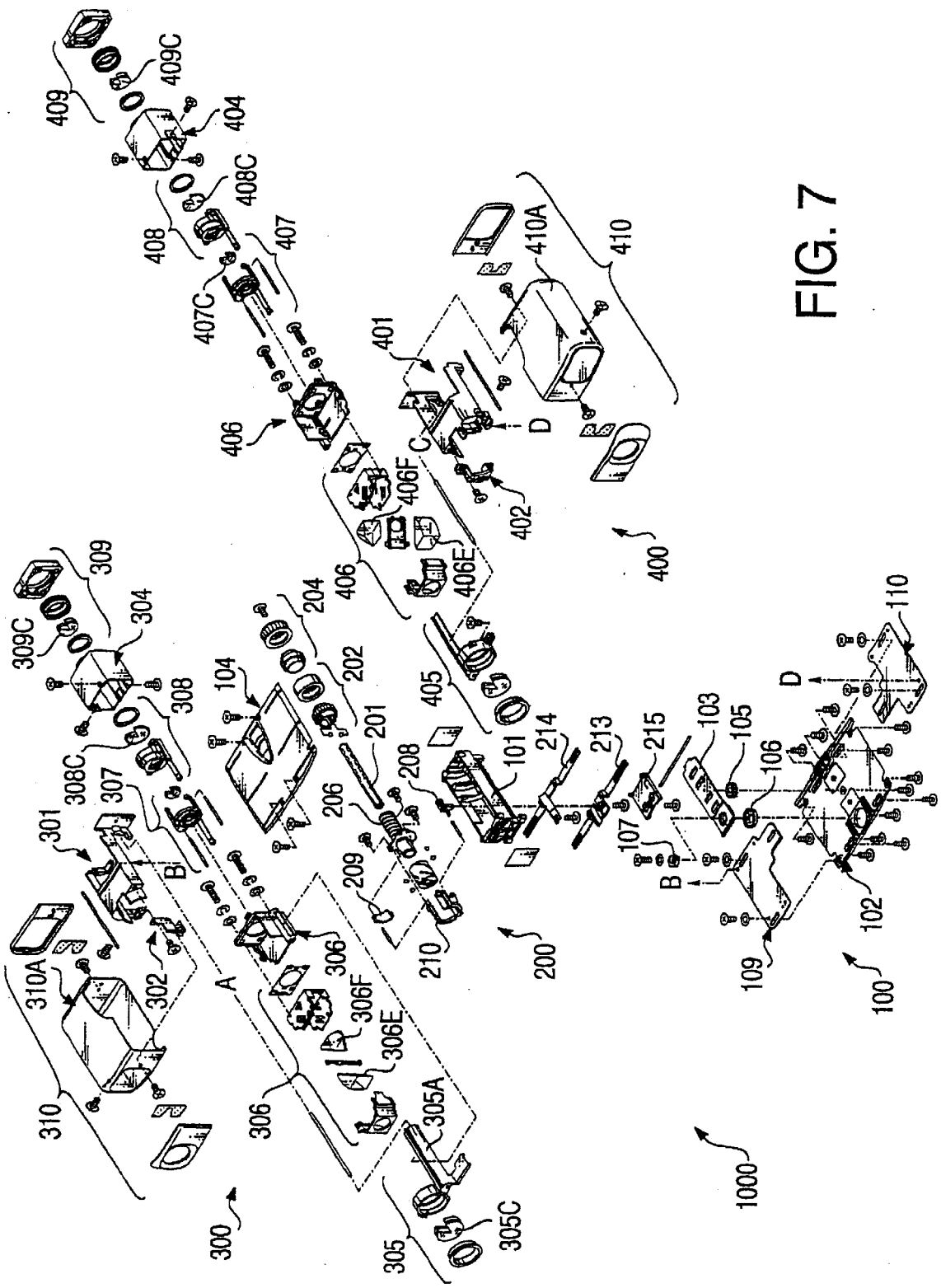
FIG. 7 shows an exploded perspective view, illustrating an overview of the binocular.

FIG. 5 shows a partially cross-sectioned top plan view of the binocular 1000, FIG. 6 shows a cross-sectioned view of FIG. 5 along a line VI—VI of FIG. 5, and FIG. 7 shows an exploded perspective view illustrating an overview of the binocular assembly.

Figure 8:
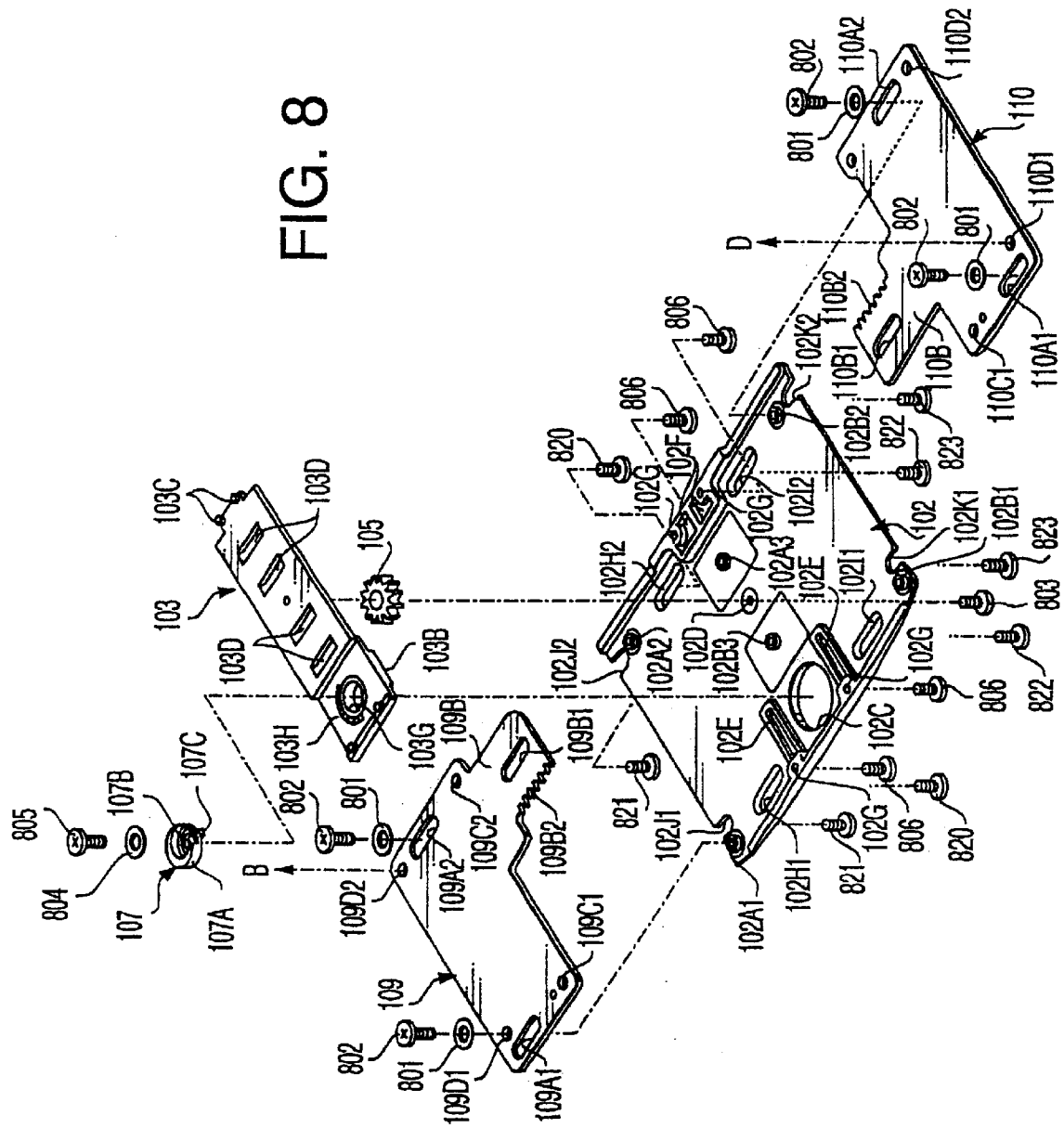
FIG. 8 shows an exploded perspective view, illustrating a portion of a supporting member shown in FIG. 7.
Figure 9:
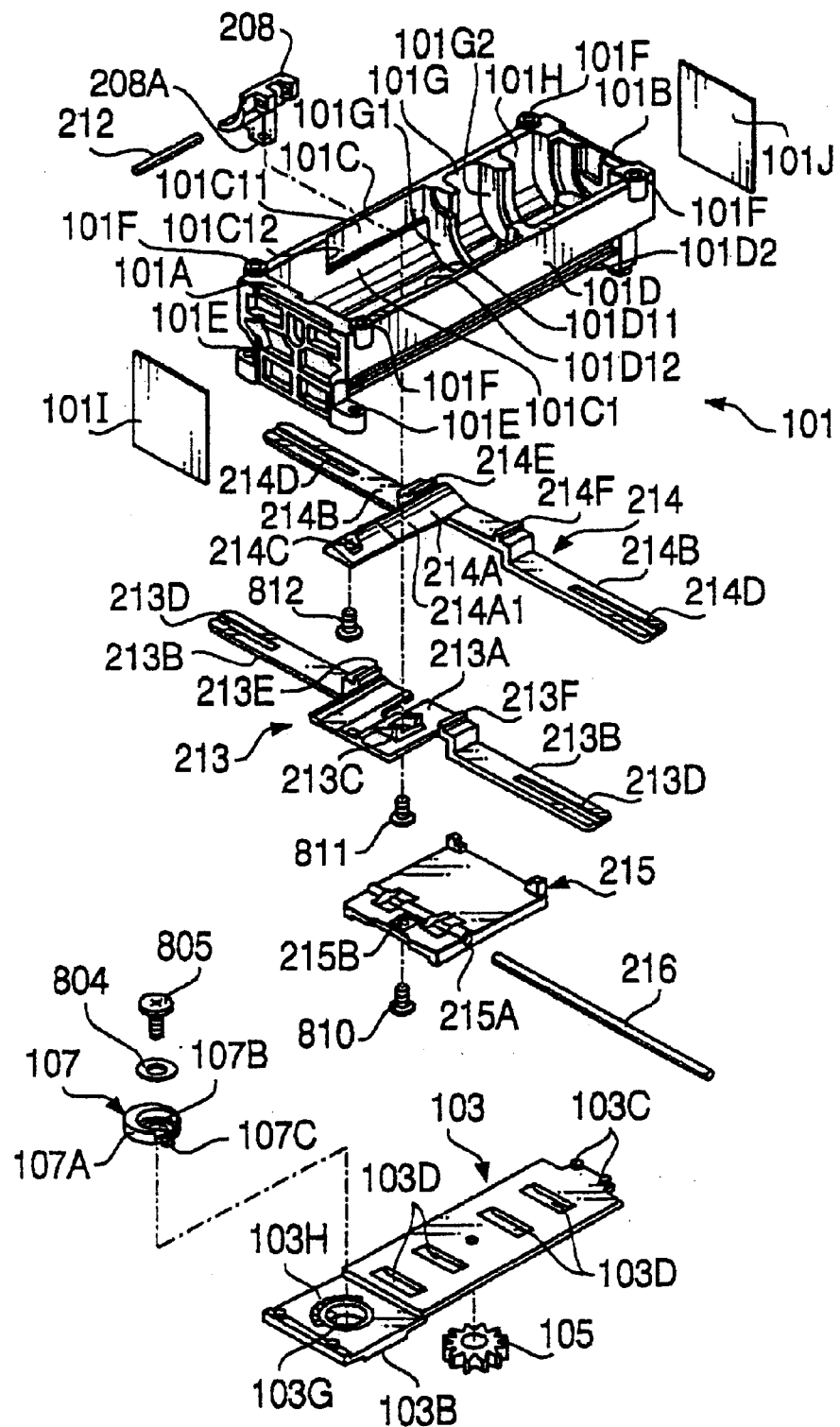
FIG. 9 shows an exploded perspective view, illustrating a portion of an optical operating unit and a supporting unit shown in FIG. 7.
Figure 10:
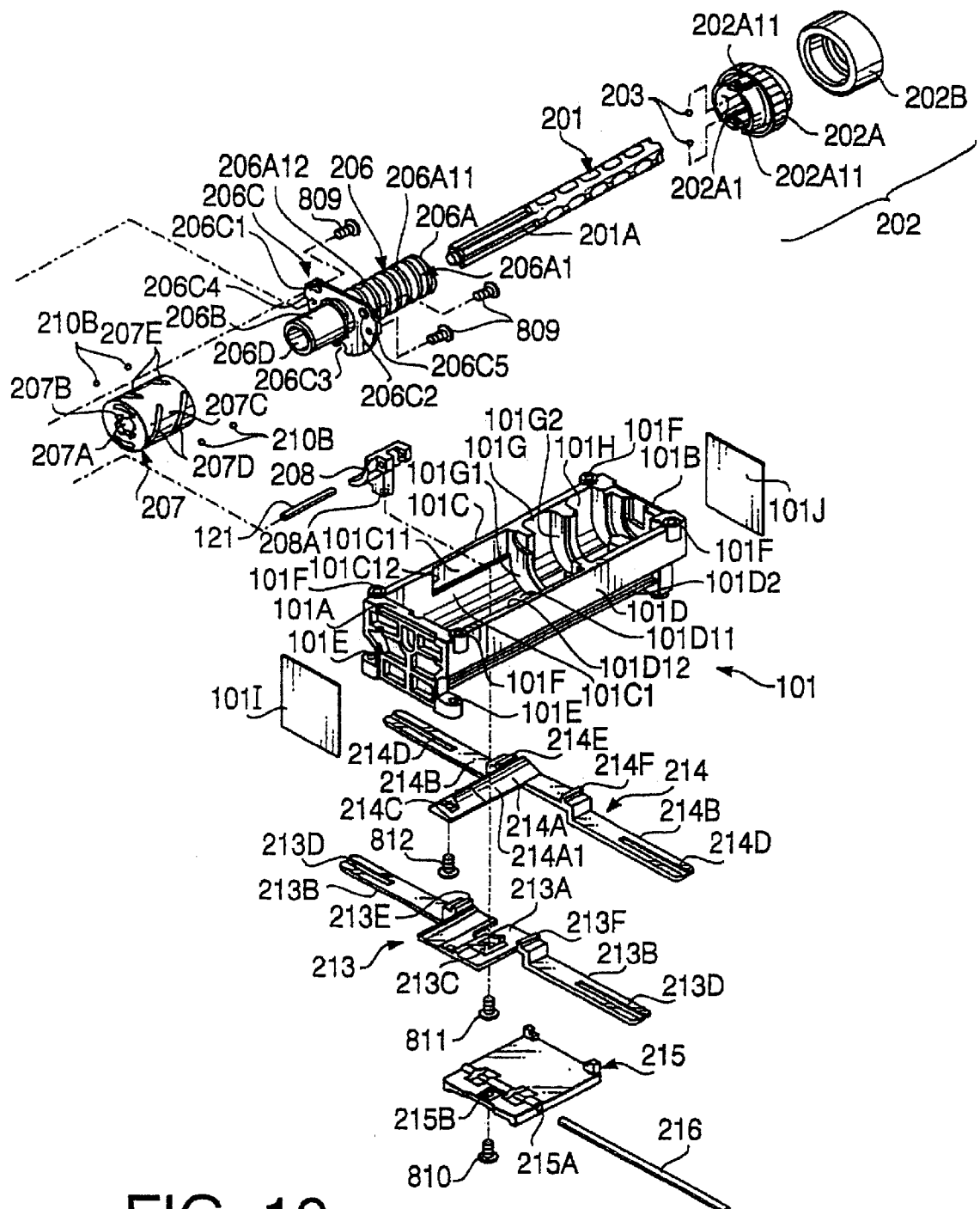
FIG. 10 shows an exploded perspective view, illustrating the structure of the optical operating unit shown in FIG. 7.

FIG. 8 shows an exploded perspective view illustrating a portion of a supporting member, FIG. 9 shows an exploded perspective view illustrating a portion of an optical operating unit and the supporting unit, FIG. 10 shows an exploded perspective view illustrating the structure of the optical operating unit, and FIG. 11 shows an exploded perspective view illustrating a structure of a portion of the optical operating unit and an upper plate.

Figure 12:
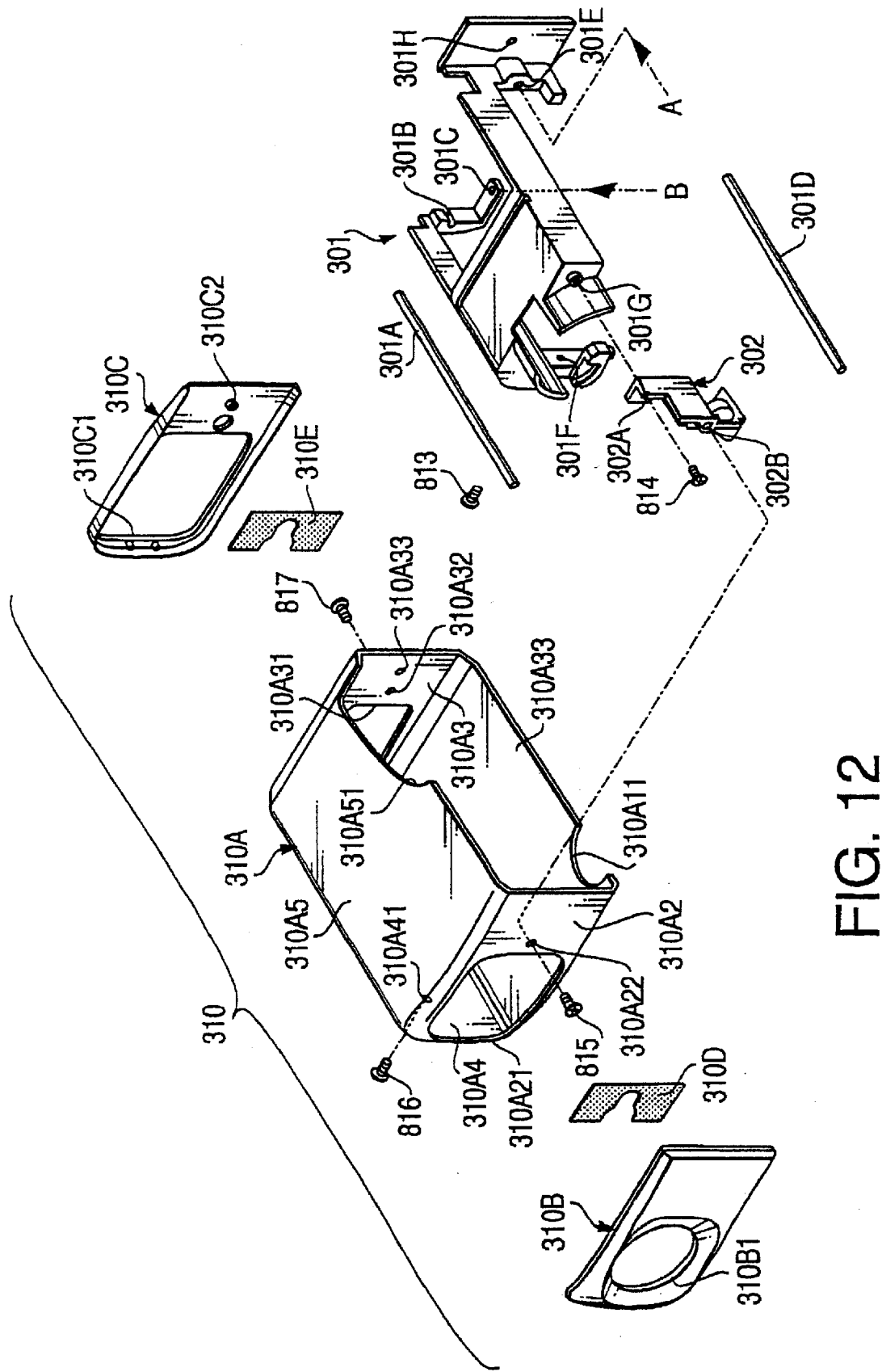
FIG. 12 shows an exploded perspective view, illustrating at least a right outer unit of a right lens barrel.
Figure 13:
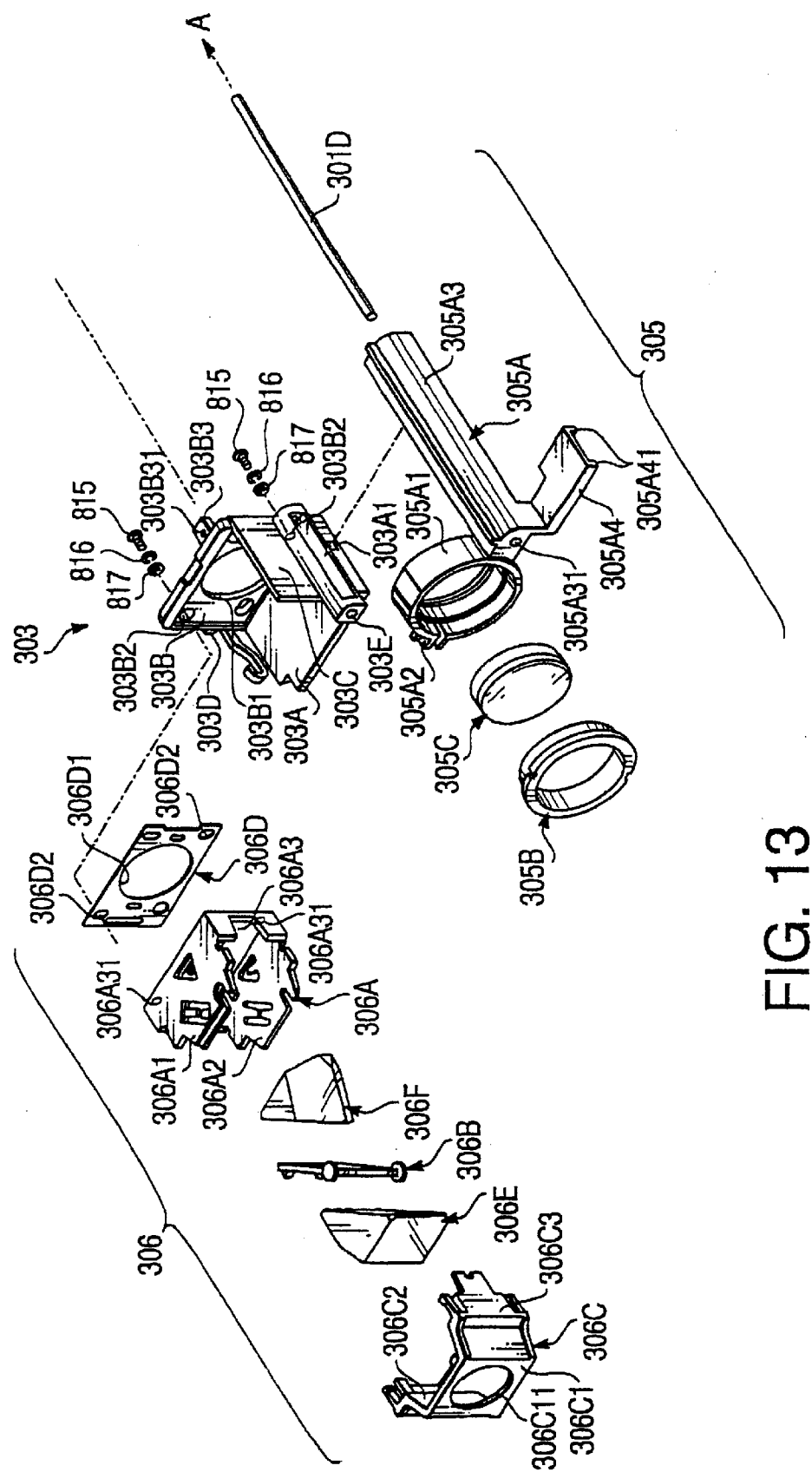
FIG. 13 shows an exploded perspective view, illustrating at least a right moving unit, a right objective unit and a right prism unit of the right lens barrel.
Figure 14:
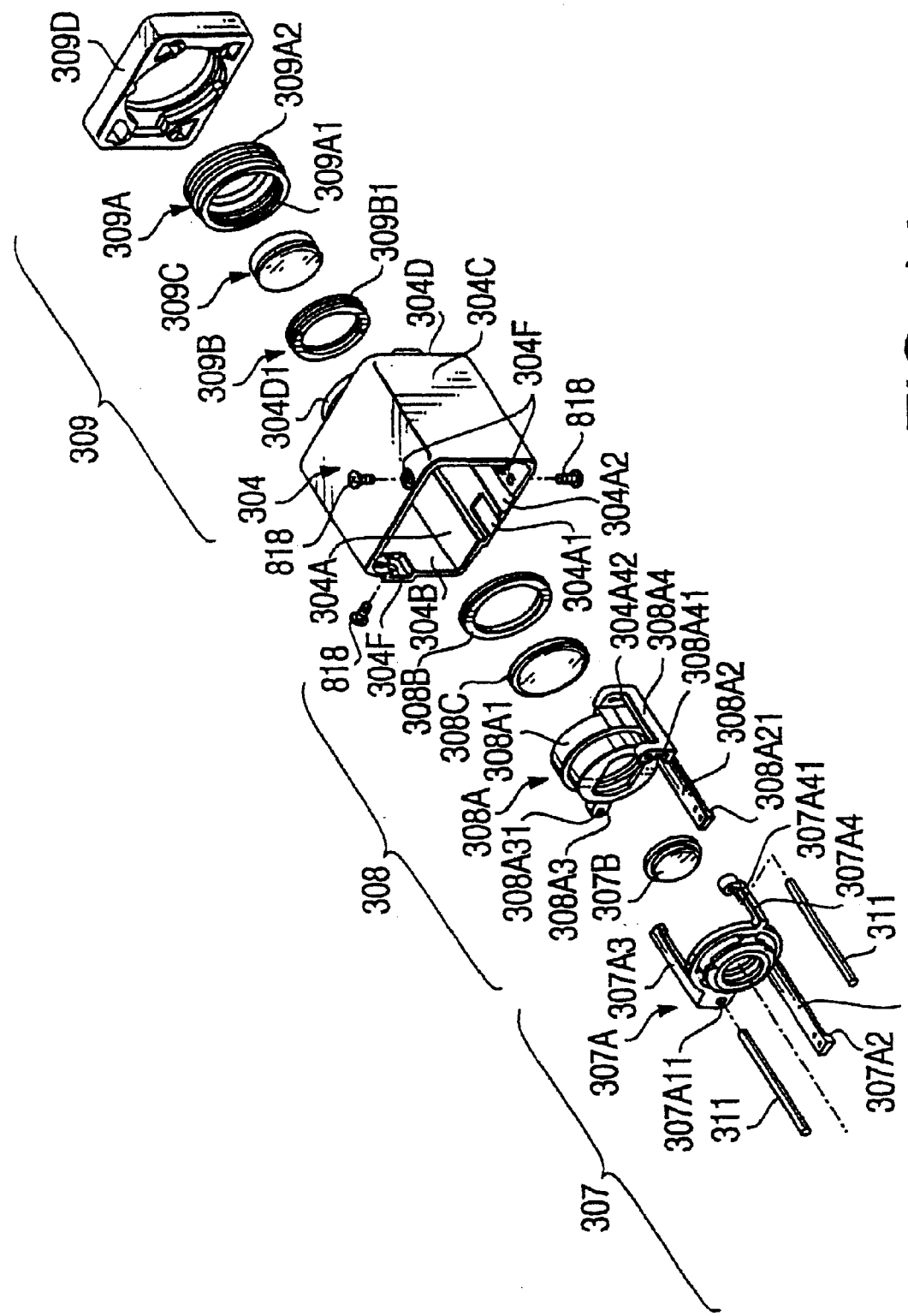
FIG. 14 shows an exploded perspective view, illustrating at least a first lens unit, a second lens unit and an eyepiece unit of the right lens barrel.

FIG. 12 shows an exploded perspective view illustrating mainly a structure of a right outer unit of the right lens barrel FIG. 13 shows an exploded perspective view illustrating mainly a structure of a right moving unit, a right objective unit and a right prism unit of the right lens barrel, FIG. 14 shows an exploded perspective view illustrating mainly a structure of a first lens unit, a second lens unit and an eyepiece unit of the right lens barrel.

Figure 15:
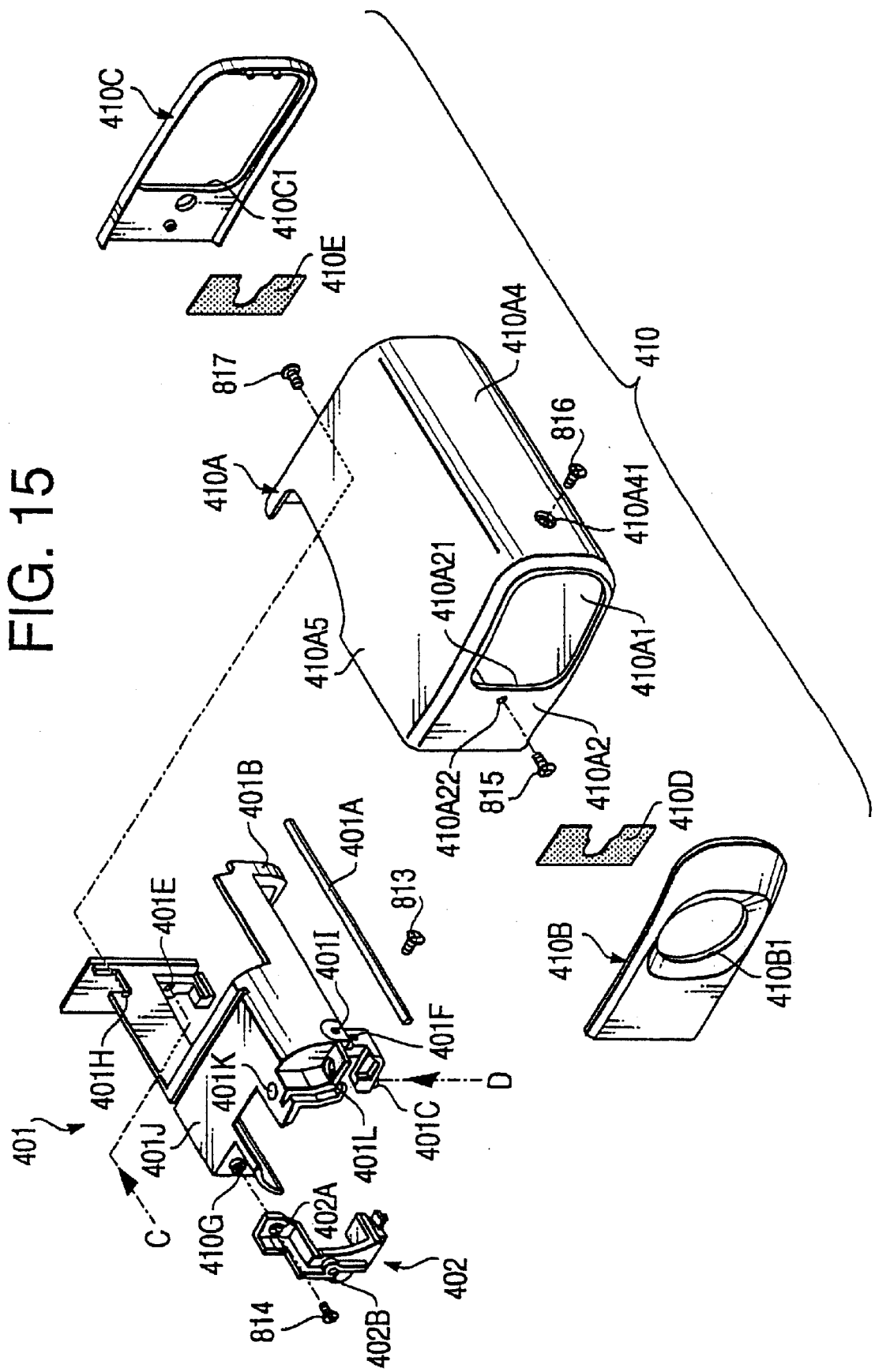
FIG. 15 shows an exploded perspective view, illustrating at least a left outer unit of the left lens barrel.
Figure 16:
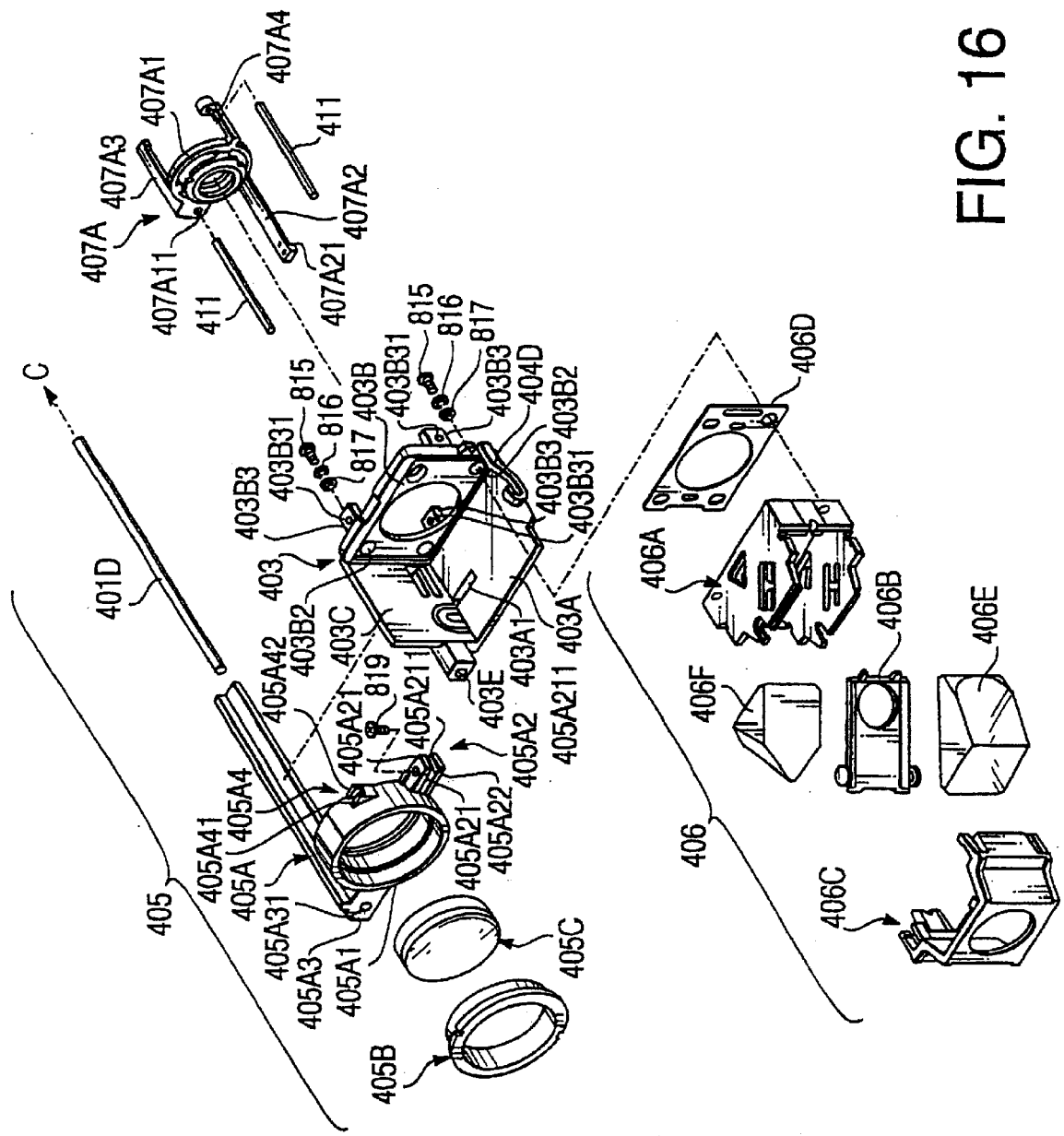
FIG. 16 shows an exploded perspective view, illustrating at least the objective unit, the first lens unit and the second lens unit of the left lens barrel.
Figure 17:
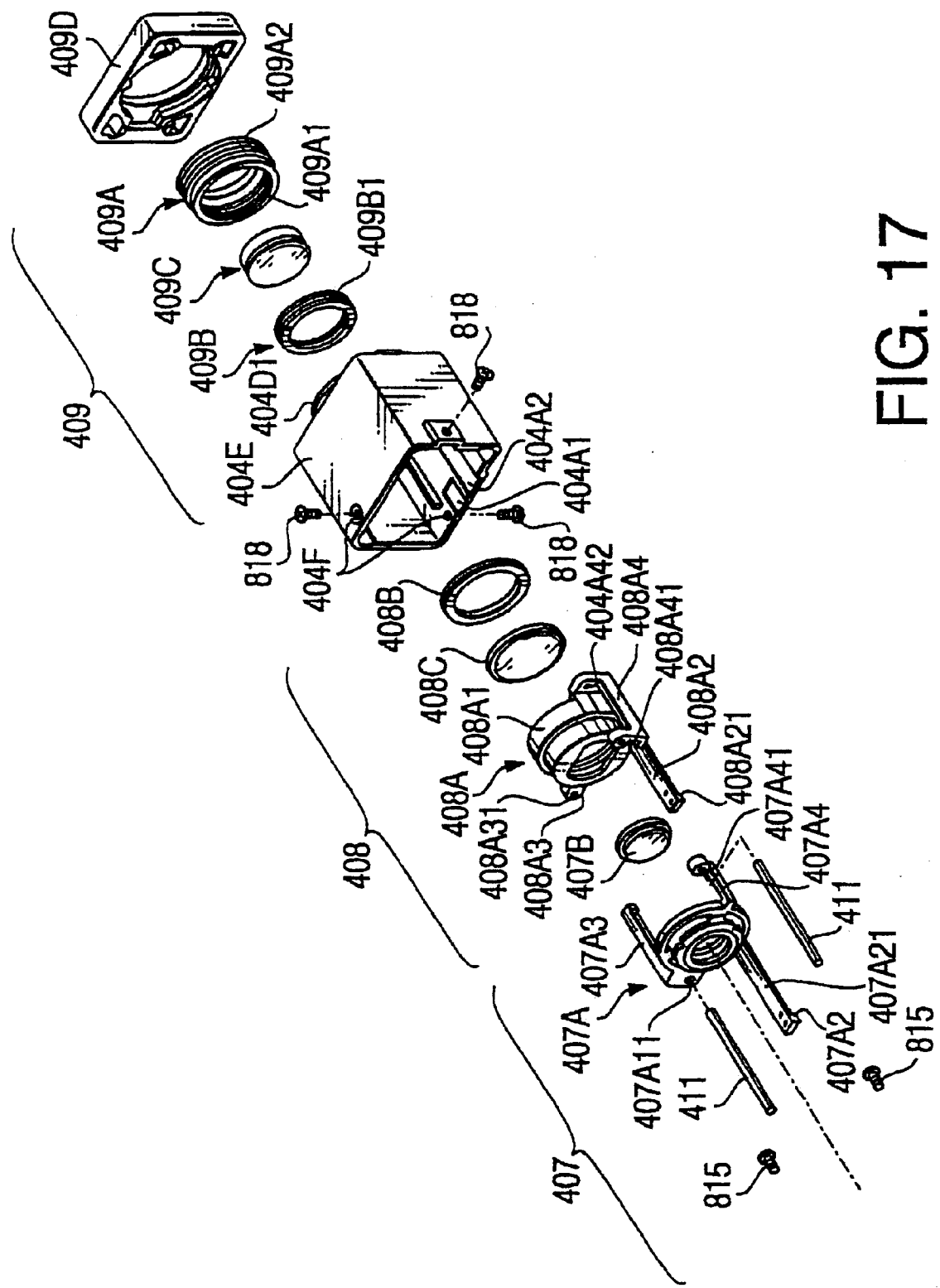
FIG. 17 shows an exploded perspective view, illustrating at least the first lens unit, the second lens unit and the eyepiece unit of the left lens barrel.

FIG. 15 shows an exploded perspective view illustrating mainly a structure of a left outer unit of the left lens barrel, FIG. 16 shows an exploded perspective view mainly of the structure of the objective unit, the first lens unit and the second lens unit of the left lens barrel, FIG. 17 shows an exploded perspective view of mainly the structure of the first lens unit, the second lens unit and the eyepiece unit of the left lens barrel.

Referring to the FIGS. 7 to 11, the structures of the supporting unit 100 and the optical operating unit will now be described.

As shown in FIGS. 7 through 11, the supporting unit 100 includes a body 101 (shown in FIGS. 9 and 10), a supporting plate 102 (shown in FIGS. 7 and 8), a bottom lid 103 (shown in FIGS. 7 through 9), an upper plate 104 (shown in FIGS. 7 and 11), a pinion gear 105, a right cooperation plate 109, a left cooperation plate 110 and other parts as described below. The bottom lid 103 is provided with the diopter decorative ring 106 and a diopter arranging eccentric seat 107 that constitute the diopter correction unit, which is described below.

The supporting plate 102 is formed in a generally rectangular shape, and has longitudinal sides that are substantially parallel to a front and a rear edge lines of the binocular 1000. The right and left sides of the supporting plate 102 are parallel to the right and left sides of the binocular 1000.

As shown in FIG. 8, two protrusions 102A1 and 102A2 are formed disposed in the vicinity of the upper right edge portion, near to the front corner and rear corner, respectively, of the supporting plate 102. Similarly, two protrusions 102B1 and 102B2 are formed disposed in the vicinity of the upper left edge portion, near to the front corner and rear corner, respectively, of the supporting plate 102.

Two protrusion 102B3 and 102A3 are formed in this order from the front side of the supporting plate 102 and projecting therefrom, and positioned approximately on the binocular center line between the lateral sides on the supporting plate 102. A circular opening 102C is formed between the front protrusion 102B3 and the front edge, and a threaded hole 102D is formed (penetrating the supporting plate 102) between the two protrusions 102B3 and 102A3.

Two engaging grooves 102H1 and 102I1 are formed (penetrating the supporting plate 102 in the height direction)), extending near to and parallel to the front edge of the supporting plate 102. The engaging groves 102H1 and 102I1 are formed symmetrically with respect to the center of the width of the binocular 1000. Similarly, two engaging grooves 102H2 and 102I2 are formed (penetrating the supporting plate 102 in the height direction), extending near to and parallel to the rear edge of the supporting plate 102. The engaging groves 102H2 and 102I2 are also formed symmetrically with respect to the center of the width of the binocular 1000.

Two notches 102J1 and 102J2 are cut disposed at a predetermined distance along the right edge of the supporting plate 102, near to the front and rear edge, respectively, and opening to the right. Two notches 102K1 and 102K2 are provided similarly at the left edge disposed at a predetermined distance along the left edge of the supporting plate 103 and opening to the left.

A right slide plate 109 includes a rectangular body 109A, and an extending member 109B extending from the rectangular body 109A. Two guiding grooves 109A1 and 109A2 are formed near to front and rear edge of the rectangular body 109A, extending in the width or lateral direction, so as to receive the projections 102A1 and 102A2 penetrating therethrough. A guiding groove 109B1 is formed on the extending member 109B, extending laterally, to receive the projection 102A3 penetrating therethrough.

Two threaded holes 109C1 and 109C2 are provided, penetrating the right slide plate 109, respectively positioned at the front and rear corners of the left side of the body 109A of the right slide plate 109, and two threaded holes 109D1 and 109D2 are provided, penetrating the right slide plate 109, respectively positioned at the front and rear corners of the right side of the body 109A of the right slide plate 109. The threaded holes 109C1 and 109C2 are disposed with the same distance therebetween as is between the guiding grooves 102H1 and 102H2, and the through hole 109D1 and 109D2 are disposed with the same distance therebetween as is between the notches 102J1 and 102J2 on the supporting plate.

The left slide plate 110 includes a rectangular body and an extending member 110B extending from the rectangular body 110A. Two guiding grooves 110A1 and 110A2 are formed near to the front and rear edges of the rectangular body 110A, extending laterally or in the width direction, so as to receive the projections 102B1 and 102B2 penetrating therethrough. A guiding groove 110B1 is formed on the extending member 110B, extending laterally, to receive the projection 102A3 penetrating therethrough.

Two threaded holes 110C1 and 110C2 are provided, penetrating the left slide plate 110, respectively positioned at the front and rear corners of the left side of the body 110A of the left slide plate 110, and two threaded holes 110D1 and 110D2 are provided, penetrating the left slide plate 110, respectively positioned at the front and rear corners of the left side of the body 110A of the left slide plate 110. The threaded holes 110C1 and 110C2 are disposed with the same distance therebetween as is between the guiding grooves 102I1 and 102I2, and the through hole 110D1 and 110D2 are disposed with the same distance therebetween as is between the notches 102K1 and 102K2 on the supporting plate.

A right rack 109B2 and a left rack 110B2 are provided respectively at the front edge of the extending member 109B of the right slide plate 109, and at the rear edge of the extending member 110B of the left slide plate 110. the right rack 109B2 and left rack 110B2 extend laterally, in the width direction, toward the center of the binocular 1000.

The right slide plate 109 is slidably supported on the supporting plate 102, with each guiding grooves 109A, 109A2 and 109B1 having inserted therethrough, respectively, the projections 102A1, 102A2 and 102A3, each of which has a threaded hole formed thereon. In this manner, screws 802 are engaged to the threaded holes having intervening washers 801.

The left slide plate 110, similarly, has the guiding groove 110A1, 110A2 and 110B1 having inserted therethrough, respectively, the projections 102B1, 102B2 and 102B3s each of which has a screw engaging a threaded hole and intervening washers 801.

A pinion gear 105 is disposed between the right and left rack 109B2, 110B2 so as to mesh with the two racks 109B2, 110B2. The shaft portion of a screw 803 penetrates the threaded hole 102D on the supporting plate 102 from the underside thereof, and also penetrates a center hole of the gear 105, ultimately engaging a threaded hole 103A of the bottom lid 103.

The position and arrangement of the bottom lid 103 are shown in FIGS. 7 and 8, while FIG. 23 is an enlarged perspective view of the bottom lid. Further, FIGS. 24A, 24B, and 24C are orthogonal views of the bottom lid of FIG. 23, showing top, side center section, and bottom views, respectively, while FIG. 24D shows cross sections taken through FIG. 24B. In particular, from top to bottom, FIG. 24D shows a cross-section through threaded hole 103A; a cross section through a position between two protrusions 103D; a cross section through a protrusion 103D; and a cross section through hole 103G. The bottom lid 103 is a rectangular-shaped plate, having a longitudinal direction being extending in the optical direction, and being supported above the supporting plate 102. The bottom lid 103 and the supporting plate 102 are positioned on either side (top and bottom, respectively) of the extending portion 109B of the right slide plate 109 and the extending portion 110B of the left slide plate 110. Further, the bottom lid 103 is positioned between the under surface of the body 101 and upper surface of the supporting plate 102 in a manner detailed below.

The position of bottom lid 103 with respect to the supporting plate 102 is determined as described herein. Edge portions 103B (the right side edge portion 103B being hidden in FIGS. 8 and 23, but visible in FIG. 24C) formed on the right and left front edges are inserted into the grooves 102E extending along the optical direction, on both right and left edges of the supporting plate 102. Accordingly, notches 103C formed at the rear right and left edges of the bottom lid 103 are fitted into the projections 102F formed at the rear right and left edges, symmetrically formed with respect to the width direction, on the upper surf ace of the supporting plate 102. Accordingly, the bottom lid 103 is positioned on the supporting plate 102. In the center of the projection 102F is formed a threaded through hole 102G, through which a screw 806 is inserted. It should be noted that throughout the drawings, the various screws (including the screw 806 and various other screws) are exaggerated in scale to aid review of the drawings.

In the bottom lid 103 are formed four protrusions 103D projecting downward in the height direction. A center portion of each protrusion 103D is curved downward, i.e., having a lowest point in the lateral center, so that the protrusions 103D exhibit a curved plane (arcing from left to right) extending perpendicular to the longitudinal direction of the bottom lid 103. These four protrusions 103D press the upper surface of the extending portion 109B of the right slide plate 109 and the extending portion 110B of the left slide plate 110 (i.e., the rear two protrusions 103D press on the right side plate 109, while the front two protrusions 103D press on the left side plate 110) to create friction force when the right and left slide plates 109 and 110 are moved laterally. This friction force gives a better operation feeling to the optical barrels 300 and 400 slide laterally, as detailed below.

With the above constitution, the rack 109B2 of the right slide plate 109 and the rack 110B2 of the left slide plate 110 mesh with the pinion gear 105, so that the right slide plate 109 and left slide plate 110 slide toward and away from each other in the lateral direction. Moreover, since the racks 109B2, 110B2 and the pinion gear 105 have the same tooth pitch for engagement, the right slide plate 109 and left slide plate 110 simultaneously move the same distance in the opposite direction (with respect to each other).

A through hole 103G is formed in an area surrounded by the right and left protrusions 103B, at the front part of the bottom lid 103.

A user diopter adjustment mechanism is shown in FIGS. 6 through 9, and portions thereof are shown in FIGS. 25A, 25B, 26A through 26C, and 27A through 27C. FIGS. 25A and 25B are perspective views of a diopter eccentric seat and diopter decorative ring, respectively. FIGS. 26A, 26B, and 26C are orthogonal views of the diopter decorative ring of FIG. 25B, showing top, side, and bottom views, respectively. FIGS. 27A, 27B, and 27C are orthogonal views of the diopter eccentric seat of FIG. 25A, showing top, side, and bottom views, respectively.

As shown in FIGS. 6 and 25B, the diopter decorative ring 106 has a disc-shaped diopter correction body 106A having a disc diameter that is larger than that of the through hole 103G, a shaft portion 106B projected from the upper center of the body 106A, and a threaded hole 106C that is formed on the shaft portion 106B, and having an axis parallel to that of the shaft portion 106B. (The shaft portion 106B corresponds to a first shaft portion of a first eccentric member in the claims.) As shown in FIGS. 6 and 24A, the diopter decorative ring 106 engages a diopter eccentric seat 107. The diopter is corrected by rotating the body 106A about the axis of the shaft portion 106B, as detailed below, which in turn rotates protrusions 107C of the diopter eccentric seat 107 engaging indentations 106D, and thereby the entire diopter eccentric seat 107. As shown in FIG. 27B and 27C, two engaging protrusions 107C are provided on opposite sides of the eccentric axis of the diopter eccentric seat 107, for engaging two engaging slots 106D (shown in FIGS. 25B and 26A) of the diopter decorative ring 106. Here, even if only one engaging slot 106D and corresponding protrusions 107C of the diopter eccentric seat 107 engage, the mechanism can correct the diopter; that is, engagement via only one engaging slot 106D and only one corresponding protrusion 107C may be considered equivalent, although engagement of two portions provides more positive driving.

As shown in FIGS. 25A and 27A through 27C, the diopter eccentric seat 107 is provided with a disk-shaped body 107A (corresponding to a first eccentric portion of a first eccentric member) having a disc diameter that is larger than the inner diameter of the through hole 103G, an eccentric hole 107B penetrating the disk-shaped body 107A in the height direction, with a predetermined eccentricity relative to a center of the body 107A, and the two protrusions 107C which are inserted to the two engaging slots 106D of the diopter decorative ring 106.

As assembled, the shaft portion 106B of the diopter decorative ring 106 penetrates the through hole 103G from the under side of the bottom lid 103, and is inserted into the eccentric hole 107B of the diopter eccentric seat 107. The two protrusions 107C of the diopter eccentric seat 107 are inserted into the two engaging slots 106D of the diopter decorative ring 106. As shown in FIGS. 6 through 8, a screw 805, having a spring washer 804, is inserted through the eccentric hole 107B of the diopter eccentric seat 107 and affixed, so that the shaft portion of the screw 805 is screw coupled into the screw hole 106C formed at the shaft portion of the diopter decorative ring 106, fixing the diopter eccentric seat 107 on the diopter decorative ring 106 via the bottom lid 103.

In such a constitution, as shown in FIG. 6, the body 106A of the diopter decorative ring 106 is exposed (downward from the bottom surface of the supporting plate 102) through the through hole 102C. The diopter decorative ring 106, coupled with the diopter eccentric seat 107, is disposed at the center in the width direction of the binocular 1000 and near to the front end of the binocular 1000.

Referring to FIGS. 6 and 24C, the periphery of the trough hole 103G under the bottom lid 103 is formed with a protrusion 103J in the peripheral direction (hidden in FIG. 6, but shown in FIG. 24A). The protrusion 103J engages with a curved channel 106E on the upper portion of the diopter decorative ring 106 while engaged, so that the end of the peripheral curved channel 106E of the diopter decorative ring 106 abuts the end of the peripheral protrusion 103J for controlling the amount of the rotation of the diopter decorative ring 106.

The diopter decorative ring 106 and the diopter correction eccentric seat 107 are integrally fixed in the rotation direction of the shaft 106B, by the engagement between the concaved portion 106D and the protrusions 107C, but are slightly movable in the shaft direction of the shaft portion 106B so as to permit detent "clicking" as described below.

Referring to FIGS. 6, 23, and 24A, an engagement portion 103H composed of a plurality of detent knurled portions extends about the peripheral direction of the through hole 103G, formed at the peripheral portion of the through hole 103G of the upper surface of the bottom lid 103. Further, a protrusion or set of protrusions 107D (hidden in FIG. 6, but shown in FIG. 27C) formed under the surface of the diopter eccentric seat 107 engages the engaging portion 103H. Although three protrusions 107D are shown in FIG. 27C, one protrusion is sufficient (or two). Accordingly, the protrusion(s) 107D "clicks"with the engaging portion 103H, while the diopter decorative ring 106 is rotated, giving a comfortable operational clicking feeling (tactile and/or auditory feedback) thereby. In this operation, the spring washer 804 presses the under surface of the body 107A and the protrusions 107D of the diopter eccentric seat 107 onto the engaging portion 103H to provide sufficient play to permit the "clicking" engagement without excessive tightness or jamming.

As shown in FIG. 9 and 10, the body 101 of the supporting unit 100 is provided with a front wall 101A, a rear wall 101B, a right wall 101C and a left wall 101D that connect the right and left side of the front and rear wall 101A and 101B. The upper and under portion of the body 101 is open to the top side in a rectangular shape.

The underside of the body 101, being covered by the bottom lid 103, is coupled onto the supporting plate 102. Four screws 806 are inserted through four screw holes 102G formed on the supporting plate 102, to be screw coupled to the four threaded holes 101E formed at the under side of the body 101.

As shown in FIGS. 7 and 11, the upper plate 104 is formed in a generally rectangular shape and is of and approximately the same size as the supporting plate 102, and covers the upper part of the body, when attached. Openings 104B and 104C are formed in the center in the width direction near to the rear end of the binocular, so that a portion of each of the focus arrangement ring 202 and zooming arrangement ring 204, respectively, which are accommodated therein, are exposed therethrough.

Rectangular shaped decorative plates 101I and face plate 101J are respectively attached to the front side of the front wall 101A and the rear side of the rear wall 110B.

In the supporting portion 100 mentioned above, the body 101, supporting plate 102, bottom lid 103 and the upper plate 104 are integrally fixed. The right slide plate 109 and left slide plate 110 are supported slidably in the width direction by the supporting plate 102.

The optical operating unit 200, shown in FIGS. 7, 10, and 11, is described below.

Referring to both FIGS. 10 and 11, the optical operating unit 200 is provided with a body 101 (FIG. 10), a main shaft 201 (FIGS. 10 and 11), a focus arrangement ring 202 (FIGS. 10 and 11), a zooming arrangement ring 204 (FIG. 11), a movement shaft 206 (FIGS. 10 and 11), a cam ring 207 (FIGS. 10 and 11), a first lens guiding piece 208 (FIGS. 10 and 11), a second lens guiding piece 209 (FIG. 11), a cam frame 210 (FIG. 11), a guiding piece shaft 211 and 212 (FIG. 11), a first lens slider 213 (FIG. 10), a second lens slider 214 (FIG. 10), a pressing plate 215 (FIG. 10), a cooperation shaft 216 (FIG. 10) and additional parts as discussed below.

The main shaft 201 extends parallel to the optical axis of the lens barrels 300 and 400. The front and rear ends of the main shaft 201 are supported respectively by axle bearings provided on the front wall 101A and rear wall 101B of the body 101. The main shaft 201 rotatably supports the focus arrangement ring 202 and the zooming arrangement ring 204, as detailed below. The diopter decorative ring 106 is rotatably disposed about an axis perpendicular to the axis of the main shaft 201.

On the outer peripheral surface of the front end portion, splines 201A are formed extending along the axis direction, disposed at a predetermined distance about the periphery of the front end portion of the main shaft 201 and extending for a predetermined distance along the front end portion of the main shaft 201. These splines 201A is inserted into matching grooves 207B formed in a hole 207A of the cam ring 207.

The zooming arrangement ring 204 includes a ring-shaped body 204A d and a rubber ring 204B covering the outer periphery of the body 204A.

The body 204A includes a hole Al having an inner bore through which the rear portion of the main shaft 201 is inserted, the body 204A being coupled to the main shaft 201. A screw 808 screw-couples the body 204A to the rear portion of the main shaft 201 from the rear side.

The cam ring 207, a cylindrically shaped cam with an outer wall, having a width in the peripheral direction and a length in the axis direction, includes a hole 207A formed on the outer wall. The hole 207A is provided with the grooves 207B formed along the diameter for engaging the splines 201A of the main shaft 201. In such a manner, the cam ring 207 is supported by the main shaft 201 to slide along the axis, but is not rotatable around the main shaft 201. The outer peripheral surface 207C of the cam ring 207 is provided with two first cam grooves 207D and two second cam grooves 207E formed about the outer peripheral surface 207C.

The moving shaft 206 includes a first shaft portion 206A provided at the rear portion thereof, a second shaft portion 206B at the front portion thereof, a flange 206C formed between the first and second shaft portion, and a hole 206D penetrating the first shaft portion 206A, the flange 206C and the second shaft portion 206B and extending along the axis of the moving shaft 206. The inner diameter of the hole 206D is formed so that the main shaft 201 is rotatable while inserted therethrough.

A helical guiding groove 206A1 is formed on the outer peripheral surface of the first shaft portion 206. The guiding groove 206A1 includes a first groove portion 296All with a wide pitch a long the shaft direction, and a second groove portion 206A12 with a narrow pitch in this order toward the object side.

The focus arrangement ring 202 includes a ring body 202A and a rubber ring 202B, the rubber ring covering the circumference of the body 202A. The diameters of the focus arrangement ring 202 and zooming arrangement ring 204 are formed to be approximately the same size. That is, the outer diameters of the rubber ring 202B and 204B have nearly the same size.

The inner peripheral surface 202A1 of the body 202A has two ball holders 202A11 formed therein on the opposite positions in the diameter direction to hold two balls 203, in a manner such that the two balls can rotate but are not movable in the diameter direction.

An arm 202A1 is integrally formed on the body 202A (shown in FIG. 11), extending in the diameter direction, to rotate when the focus arrangement ring is rotated. The balls 203 engaged in the engagement portion 202A11 on the arm 202A1, in such a case, moves along the helical guiding groove 206A1 formed in the first shaft portion 206A of the moving shaft 206, the helical guiding groove 206A1 being formed "doubled screwed", i.e., having a thread pitch that changes from coarser to finer along its length, on the first shaft 206A of the moving shaft 206.

Protrusions 206C4, 206C5 (shown in FIG. 11) are formed on the right and left portion of the flange 206C of the moving shaft 206. The protrusions 206C4, 206C5 are arranged to engage and move along guiding grooves 101C11 and 101D11 (shown in FIG. 9) formed extending along the right and left wall 101c and 101D.

When assembled, each protrusion 206C1 and 206C2 abuts a respective bank 101C12 and 101D12 (shown in FIGS. 9 and 10) for restricting the front range of the moving shaft 206. Moreover, each protrusion 206C4 and 206C5 abuts the rear wall 101G1 (shown in FIGS. 9 and 10) of the body 101 for restricting the rear movable range.

As shown in FIG. 11, when the balls 203 engage the first groove 206A11 (with a wide/coarser pitch), the moving amount of the moving shaft by rotation of the focus rotation ring 202 is larger than that when engaging the second groove 206A12 (with a narrow/finer pitch).

The cam frame 210, shown in FIG. 11, is a substantially ring-shaped frame, having an inner portion 210A. Both of the upper sides of the inner portion 210A hold a shaft (numbered 211, 212 on right and left sides) extending parallel to the optical axis. The circumference of each shaft 211, 212 faces the center axis of the cam frame 210. The first lens guiding piece 208 and the second lens guiding piece 209, respectively, are slidably held on shafts 211, 212.

The cam frame 210 is held by an inner surface of a right side wall 101C and an inner surface of a left side wall 101D of the body 101, so that the cam frame 210 can move along the optical axis, but is not rotatable about the axis.

The main shaft 201 is inserted in a hole 207A of the cam ring 207, and the cam ring 207 axially and slidably supported by the main shaft 201. The cam ring 207 is rotatably supported by the second shaft portion 206B of the movement shaft 206 such that the cam ring 207 is rotatable relative to, but fixed axially with respect to, the second shaft portion 206B. A bayonet-type engagement formed on the second shaft portion 206B near the flange 206C and on the rear of the cam ring 207 is employed for this purpose, although other structures would serve as well. Accordingly, the cam ring 207 is supported by the main shaft 201, and with respect to the main shaft 201, is not rotatable but is movable in the axial (optical axis) direction.

The cam frame 210, accommodating the cam ring 207, is coupled to the flange 206C of the moving shaft 206 by three screws 809, so that the cam frame 210 and the moving shaft 206 are integrally fixed.

The substantially cylindrical inner portion 210A has a right arm 210C1 on the right side of the cam frame 210, and a left arm 210C2 on the left side of the cam frame 210. The rear portions of the right and left arms 210C1 and 210C2 are respectively provided with threaded holes 210C11 and 210C21 opening rearward. In addition, a rear part of a connecting arm 210D facing rearward has a threaded hole formed therein (not shown), the threaded hole that is opening toward the rear of the binocular 1000. Threaded holes 210C11, 210C21 and the threaded hole opening to the rear are screw coupled by screws 809 that are inserted through the through holes 206C1, 206C2 and 206C3 provided on the flange 206C of the moving shaft 206, so that the cam frame 21 is fixed to the moving shaft 206. Moreover, the rear end of the connecting arm 210D has a threaded hole 210D1 formed therein facing downward.

The cam ring 207 has first cam grooves 207D and second cam grooves 207E formed therein.

As shown in FIGS. 10 and 11, the second lens guiding piece 209 has two holding surfaces therein that are spherically concave so as to hold two balls 210B, the two balls 210B being rotatably engaged in the grooves 207E of the cam ring 207. The first lens guiding piece 208 has two similar holding surfaces therein (hidden in FIGS. 10 and 11) that are shaped spherically concave so as to hold another two balls 210B, the additional two balls 201B being rotatably engaged in the grooves 207D of the cam ring 207.

When the cam ring 207, held by the cam frame 210, is rotated by the rotation of the main shaft 201, the first and second cam grooves 207D and 207E of the cam ring 207 rotate with respect to the cam frame 210. This rotation movement makes the first and second lens guiding pieces 208 and 209 move along the axial direction. Here, the first and second lens guiding pieces are disposed at both sides of the cam frame 210, facing each other and containing the cam ring 207, so that they move in the opposite directions with respect to each other along the optical axis. That results in the movable ranges of the first and second lens guiding pieces overlapping in the axial direction of the main shaft 201.

The pressing plate 215 is a rectangular-shaped plate, provided with a through hole 215B in the height direction. A screw 810, inserted through the through hole 215B, engages the bottom wall of the cam frame 210 so that the pressing plate 215 is attached to the cam frame 210. That is, the pressing plate 215 moves, at least with respect to movement along the optical axis, integrally with the moving shaft 206, the cam ring 207 and the cam frame 210 (although certain of these members are rotatable with respect to one another as set forth herein). The first and second lens slide plates 213 and 214 are intermediate the pressing plate 215 and the bottom wall of the main body 101. Protrusions on the upper rear side of the pressing plate 215 maintain a clearance in which the slide plates 213 and 214 are movable in front and rear directions.

The first lens slide plate 213 is screw coupled to the first lens guiding piece 208 by a screw 811, and is integrally movable with the first lens guiding piece 208. In a similar fashion, the second lens slide plate 214 is screw coupled to the second lens guiding piece 209 (as shown in FIG. 11) by a screw 812, and is integrally movable with the second lens guiding piece 209.

The first lens slide plate 213 is formed in one piece by a first center portion 213A and a first arm 213B. The first center portion 213A is a rectangular-shaped plate to be connected to the first lens guiding piece 208, and the first arm 213B is first bent downward from the right and left sides of the first center 213A and is then bent to extend horizontally, laterally and linearly.

The first center portion 213A is provided with an engagement portion 213C for engaging the engaging portion 208A of the first lens guiding piece 208, the engagement portion 213C having a through hole through which the screw 811 is inserted and screw-couples the engaging portion 208A.

A guided portion 213E, 213F includes a protrusion extending along the axis at the area where the right and left first arm 213B connect to the first center portion 213A. The right and left first arm portion 213B extend laterally from the guided portion. These guided portions are movably supported by the guiding portion 101C2 and 101D2 of the body 101, movable along the optical axis direction.

The first center portion 213A is movably supported in the optical axis direction, with its upper and lower surfaces in the height direction being pressed respectively by the pressing plate 215 and by the bottom of the body 101.

The right and left ends of the engaging arm 213B are provided, respectively, with channel grooves 213D formed extending laterally outward, the channel grooves 213D being engaged slidably with a first lens unit 307 (shown in FIG. 14) and 407 (shown in FIG. 17) of the right and left telescope optical system, slidable in the lateral direction.

The second lens slide plate 214 is formed in one piece of a second center portion 214A and two second arms 214B. The second center portion 214A is a substantially rectangular-shaped plate to be connected to the second lens guiding piece 209, and the second arm 214B is first bent downward from the right and left sides of the second center plate 213A and is then bent to extend horizontally, laterally and linearly.

The second center plate 214A is provided with an extension extending toward the front of the binocular 1000, where an engagement portion 214C is formed for engaging the engaging portion 209A of the first lens guiding piece 209. The engagement portion 214C has a through hole through which the screw 811 is inserted and screw-couples the engaging portion 209A of the second lens guiding piece 209. The rear bottom surface of the extension 214A connects to and is substantially flush with the upper surface of the second center portion 214A.

A guided portion 214E, 214F includes a protrusion extending parallel to the optical axis at the area where the right and left second arms 214B connect to the second center portion 214A. The right and left second arm portions 214B extend laterally from the guided potion.

These guided portions are movably supported by the guiding portion 101C2 and 101D2 of the body 101, movable along the optical axis direction.

The second center portion 214A is movably supported in the optical axis direction, with its upper and lower surfaces in the height direction being pressed respectively by the pressing plate 215 and by the bottom of the body 101.

The right and left ends of the engaging arm 214B are provided respectively with channel grooves 214D formed extending laterally outward, the channel grooves 214D being engaged slidably with a second lens unit 308 (as shown in FIG. 14) and 408 (as shown in FIG. 17)of the right and left telescope optical system, slidable in the lateral direction.

The first and second lens slide plates 213 and 214 are disposed in this order along the optical axis, and are intermediate the pressing plate 215 and the bottom of the body 101, wherein the upper surface of the first center portion 213A is abutted by the extension 214A1 of the second center portion 214A. With such a structure, the first and second arms 213D and 214D are flush with each other, and the first and second center portions 213A and 214A are nearly flush with each other.

A hole 215A, penetrating the pressing plate 215 laterally (left to right), is formed on the pressing plate 215 on its front area, and a sliding shaft 216 is inserted into the hole 215A and supported by the pressing plate 215, extending outward toward the right and left side of the shaft 216.

The right and left moving units 303 (as shown in FIG. 13) and 403 (as shown in FIG. 16), supporting the right and left eyepiece optical system, are respectively provided with engaging portions 303A1 and 403A1 that engage with the moving shaft 216 so that the right and left moving unit 303 and 403 are supported slidably to slide not only in the lateral direction along the moving shaft 216 but also to slide in the optical axis direction together integrally with the moving shaft 216.

The body 101 of the supporting unit 100 includes a first container 101G and a second container 101H, disposed along the optical axis with a space therebetween along the optical axis. The first container 101G accommodates the focus arrangement ring 202, held in a manner to be rotatable about the axis but unmovable along the axis direction. The second container 101H accommodates the zooming ring 204, also rotatable but unmovable along the axis direction.

In the structure mentioned above, when the zooming arrangement ring 204 is rotated, while the focus arrangement ring 202 is not rotated, the main shaft 201 fixed to the zooming arrangement ring 204 is rotated, so that the cam ring 207 fixed to the front end of the main shaft 201 is accordingly rotated in the inside of the cam frame 210.

Accordingly, the first and second cam grooves 207D and 207E, provided on the peripheral outer surface of the cam ring 207, rotate with respect to the cam frame 210. The first and second lens guiding pieces 208 and 209, engaging with the balls 210B, cooperating with the rotation of the first and second cam grooves 207D and 207E, and guided by the guiding shafts 211 and 212, are moved along the axial direction. As mentioned above, the first and second lens guiding pieces 208 and 209 move in reverse (opposite) direction with respect to each other when the zooming arrangement ring 204 is rotated.

In case the focus arrangement ring 202 is rotated, while the zooming arrangement ring 204 not rotated, the shaft 201 is not rotated. Consequently, the balls 203, engaging the body 202A of the focus arrangement 202, are not moved along the axis direction but rotate about the axis while engaging in the guiding grooves 206A1 of the moving shaft 206. Accordingly, the moving shaft 206 and the cam frame 210, integrally fixed to the shaft 206, are moved inside of the body 101, along the axis of the main shaft.

As mentioned above, the guiding grooves 206A include a first groove 206A11 with a long/wide (coarse) pitch, and a second groove 206A12 with a short/narrow (fine) pitch, the first and second groove 206A11 and 205A12 being connected with each other.

Accordingly, when the moving shaft 206 and the cam frame 210 move along the optical axis with the balls 203 engaged in the first groove 206A11, the amount of movement is much more than that with the balls 203 in the second groove 206A12. Therefore, the lens barrels can be promptly drawn into the body in the former case (first groove 206A11), and the focal distance can be arranged sensitively in the latter case (second groove 206A12).

The right lens barrel 300 and left lens barrel 400 are described below with reference to FIG. 5.

The left and right assemblies have numerous similarities. for example, the right lens barrel 300 and left lens barrel 400 include a plurality of laterally symmetric elements with the same functions. Accordingly, the present description, where elements are laterally symmetric, is restricted to the right side, and the explanation for the left side is omitted. One skilled in the art will recognize how the description for the right side maybe related to the corresponding elements on the left side. A consistent numbering scheme is used throughout this specification, such that when a part is described for the right lens barrel in the "300" series, a corresponding part on the left lens barrel is numbered similarly in the "400" series. Accordingly, the description with respect to the right side "300" series should be considered to apply to those numbered elements of the left side "400" series that appear in the drawings, but that have not been specifically described herein by such numbers. Of course, where those numbered elements of the left side "400" have been specifically described, the description thereof should be considered. Those elements laterally corresponding to each other, are designated with the same combination of numbers and alphabetical designations.

As shown in FIG. 5, the right lens barrel 300 includes a right frame 301, a right frame lid 302, a right movement unit 303, a right eyepiece cylinder 304, a right objective unit 305, a right prism unit 306, a first lens unit 307, a second lens unit 308, a right eyepiece unit 309, a right outer unit 310 and other parts as described below.

The right frame lid 302, the right objective unit 305 and the right outer unit 310, being attached to the right frame 301, are mounted to the right slide plate 109 (refer to FIG. 7), movable in the lateral direction together with the slide plate 109.

As shown in FIGS. 5 and 13, the right moving unit 303 is slidable with respect to the right frame 301 along the optical axis. The right prism unit 306 is provided at the front portion of the right moving unit 303. A right eyepiece cylinder 304 is coupled to the rear portion of the right moving unit 303. The eye piece cylinder 304 (shown in FIGS. 5 and 14) includes an eyepiece unit 309 that is coupled to the rear portion of the right eyepiece cylinder 304. Moreover, as shown in FIGS. 5 and 14, a first lens unit 307 and a second lens unit 308 are slidably disposed between the right moving unit 303 and the right eyepiece cylinder 304.

That is, the objective unit 305 is mounted to the right frame 301, while the prism unit 306, the first lens unit 307, the second lens unit 308 and the eyepiece unit 309 are mounted to the right moving unit 303. Therefore, the right moving unit 303 moves slidably with respect to the right frame 301 along the optical axis, so that as the distance between the objective unit 305 and the right prism unit 306, the first lens unit 307, the second lens unit 308 and the eyepiece unit 309 changes, accordingly, the focal distance is arranged.

Next, referring to the FIGS. 8 and 12 to 14, the structure of the right lens barrel will be detailed.

As shown in FIG. 12, right frame 301 is provided with a holding member 301B for holding the rear part of a right guiding shaft 301A (at the center in the height direction of the )rear right side. The under part of the holding member 301B has a threaded hole 301C formed therethrough, to which a screw is engaged for mounting the right frame 301 to the right slide plate 109 (refer to the arrow "B").

Referring to FIG. 8, the attachment of the right frame 301 to the right slide plate 109 is described below in detail.

Screws 820, 820 (front and rear) are screw coupled to a screw hole formed on the rear part of the right frame 301 (not shown) and to a screw hole (not shown) formed on a frame lid 302 (shown in FIG. 12, and discussed below), via guiding grooves 102H1 and 102H2 of the supporting plate 102 and through holes 109C1 and 109C2. In such a structure, the head of the screws 820 and 820 are accommodated in the guiding grooves 102H1 and 102H2 on the supporting plate 102 without interfering thereto, thereby being laterally slidable.

Screw 821, 821 are screw coupled to screw holes formed on the front and rear area of the right frame 301 via through holes 109D1 and 109D2 (the front screw hole corresponds to the screw hole 301C; refer to arrow "B" in FIGS. 8 and 12). Here, the heads of the screw hole 821 and 821 can be moved to and accommodated into notches 102J1 and 102J2 in the outer lateral side at front and rear of the supporting plate 102, without interfering thereto, thereby being laterally movable.

In such a structure, the right frame 301 is mounted on the right slide plate 109 by means of the screws 820 and 821.

The left frame 401 is also similarly mounted to the left slide plate 110 (described below with reference to FIG. 15), described immediately below.

Screws 822, 822 are screw coupled to the screw hole (not shown) formed on the rear part of the left frame 401 and to the screw hole (not shown) formed on the frame lid 402 (discussed below), via guiding grooves 102I1 and 102I2 of the supporting plate 102 and through hole 110C1 and 110C2. In such a structure, the head of the screws 822 and 822 are accommodated in the guiding groove I1 and 102I2 on the supporting plate 102I1 without interfering therewith, thereby being laterally slidable.

Screw 823, 823 are screw coupled to screw holes formed on the front and rear area of the left frame 401 via through holes 110D1 and 110D2. Here, the heads of the screw hole 823 and 823 can be moved to and accommodated into the notches 102K1 and 102K2, without interfering therewith, thereby being laterally movable.

In such a structure, the left frame 401 is mounted on the left slide plate 110 by means of the screws 822 and 823. The following description returns to describing, the right lens barrel 300.

As shown in FIG. 12, the right frame 301 is provided with a supporting member 301E at the approximately center area in the height direction of the left rear portion of the right frame 301. for supporting the rear portion of the left guiding shaft 301D (refer to arrow A).

The right frame 301 is provided with a threaded hole 301F formed approximately in the center area in the height direction of the front right wall, to which a screw 813 is screw coupled. The guiding shaft 301A is intermediate the head of the screw 813 and the right wall for supporting the guiding shaft.

As shown in FIG. 12, the right frame 301 has a threaded hole 301G formed at the right upper portion of its front wall. A screw 814 is screw coupled to the screw hole 301G via a through hole 302A, so that the right frame lid 302 is fixed to the front of the right frame 301. Further, the front end of the guiding shaft 301D (shown in FIG. 13) is supported by the right frame lid 302.

Moreover, a screw hole 302B is formed at the front portion of the right frame lid 302, to which a screw 815 is coupled via through hole 310A22 that is provided on the front wall 310A2 of the right outer housing 310A. Accordingly, the front portion of the right frame 301 is fixed to the front wall 310A2 of the outer housing 310A.

A screw 816 is screw coupled to an upper portion of the screw hole 301F of the right frame 301 via through hole 310A41 that is formed on the right wall 310A4 of the right outer housing 310A. Accordingly, the right side of the right frame 301 is fixed to the right wall 310A4 of the right outer housing 310A.

A screw hole 301H is formed on the rear left side of wall of the right frame 301, to which a screw 817 is screw coupled via through hole 310A32 that is formed on the rear wall 310A3 of the right outer housing 310A. Accordingly, the rear side of the right frame 301 is fixed to the rear wall 310A3 of the right outer housing 310A.

A hole 301J is formed on the rear left portion of the rear wall, opening rearward, to which an insertion projection 310C2 of the right rear cover 310C (discussed below) is inserted.

The right outer housing 310 includes a right outer housing 310A, a right front cover 310B, a right rear cover 310C and other parts as described herein.

As shown in FIG. 12, a right outer housing 310A includes a bottom wall 310A1, and a front wall 310A2, rear wall 310A3 and right side wall 310A4 that extend from, respectively, the front, rear and right edge of the bottom wall 310Al.

An opening 310A21 is formed on the front wall 310A2 for the objective optical system, and an opening 310A31 is formed in the rear wall 310A3 for the right eyepiece cylinder 304, including a third lens 309C, to move therethrough.

A "V" shaped notch 310A51 is formed on the left edge and rear side of the upper wall 310A5 for accommodating the focus arrangement ring 202 and the zooming arrangement ring 204.

The right front cover 310B is attached to the front side of the front wall 310A2 via a double sided adhesive tape 310D, with the opening 310B1 aligned with the opening 310B1.

The right rear cover 310C is attached to the rear side of the rear wall 310A3 via a double sided adhesive tape 310E, with the opening 310C1 aligned with the opening 310A31.

As shown in FIG. 5 and 12, the rear wall 310A3 of the right outer housing 310A is provided with a through hole 310A33, corresponding to the hole 301J of the right frame 301, through which the insertion projection 310C2 of the right rear cover 310C is inserted into the hole 301J, so that the right rear cover 310C is positioned with respect to the right frame 310 and the right outer housing 310A.

A half-circular notch 310All is formed on the front left edge on the bottom wall 310A1 of the right outer housing 310A. The half-circular notch is formed in such a manner to avoid, i.e., not to interfere with, the diopter decorative ring 106.

As shown in FIG. 13, the objective unit 305 includes an objective frame 305A, an objective pressing ring 305B, an objective lens 305C and other parts as described below.

The objective frame 305A includes a cylindrical body 305A1, a first holding portion 305A2 provided on the right side of the body 305A1, a second holding portion 305A3 extending rearward from the left side of the body 305A1, and an engaging portion 305A4 extending to the left from the front area of the second holding portion 305A3.

The inner circumference of the body 305A1 is female threaded, and an outer circumference of the pressure ring 305B is male threaded. The objective lens 305C is intermediate the body 305A1 and the pressure ring 305B, fixing the objective lens 305C securely therebetween.

The first holding portion 305A2 is provided slidably along the guiding shaft 301A (shown in FIG. 12) , holding the guiding shaft 301A.

As shown in FIG. 13, the second holding portion 305A3 is provided with a spindle hole 305A31, parallel to the optical axis, through which the guiding shaft 301D is slidably held. Thus, the objective frame 305A is configured to be slidable along the guiding shafts 301A and 301D.

Therefore, the objective lens 305C, being fit in the objective frame 305A, can be positioned anywhere along the range of positions defined by the guiding shafts 301A and 301D, along their axes.

The engaging portion 305A4 is formed in a substantially rectangular shape, having two engaging walls 305A41 extending downward at the front and rear edges thereof. The two engaging walls 305A41 are parallel to one another, extending in the lateral (left to right) direction.

The outer circumference surface of the diopter eccentric seat 107 is intermediate, i.e., held between the two engaging walls 305A41, and when the diopter eccentric seat 107 is rotated, the outer circumferential surface of the diopter eccentric seat 107 is eccentrically rotated, moving the two engaging walls 305A41 abutted thereto along the optical axis direction.

FIG. 18, 19 and 20 respectively show a bottom plan view of the binocular, in which the indicia zero point "0" mark 106F, plus "+" mark 106G and minus "−" mark 106H of the diopter decorative ring 106 are respectively aligned with the reference mark 102C.

FIGS. 5, 6 and 18 show that when the diopter eccentric seat 107 is rotated, the right objective frame 305A is moved along the optical axis, guided by the guiding shafts 301A, 301D, thereby arranging the location of the objective lens 305C along the optical axis.

That is, the right objective frame 305A is moved with respect to the right frame 301 by the rotation of the diopter eccentric seat 107 (engaged with the engaging walls 305A41) about the shaft portion 106 of the diopter decorative ring 106.

Figures 4A, 4B:
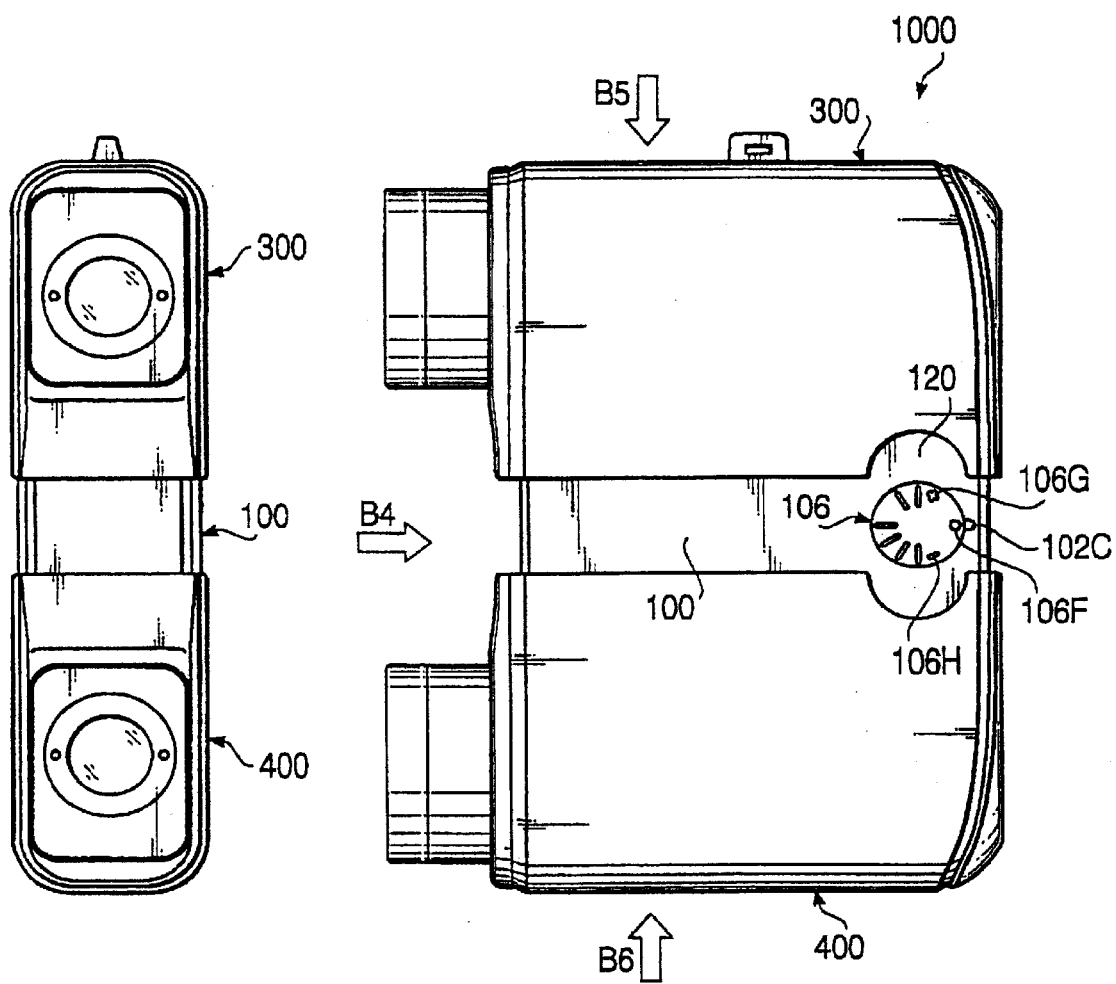
FIG. 4A shows a bottom plan view of the binocular in the same configuration as FIGS. 3A through 3D.
FIG. 4B shows a back view of the configuration of FIG. 4A seen from the direction of an arrow B4.
Figure 4C:
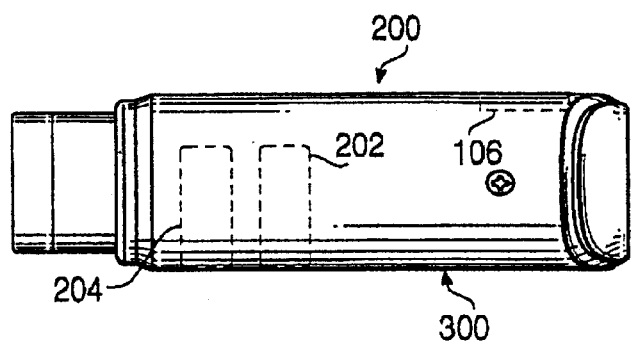
FIG. 4C shows a side view of the configuration of FIG. 4A seen from the direction of an arrow B5.

As shown in FIG. 4, when the diopter decorative ring 106 is arranged so that the zero point "0" mark 106F is aligned with the reference mark 102 provided on the supporting plate 102, the right objective frame 305A is arranged to be situated at the center point in the adjustable range with respect to the right frame 301. As previously described, the diopter decorative ring 106 and the diopter eccentric seat 107 are rotatably supported by the bottom lid 103 that is fixed on the supporting plate 102.

That is, when the diopter eccentric seat 107 is rotated, the right objective frame 305A is moved along the guiding shafts 301A and 301D (i. e., in the optical direction).

As shown in FIG. 13, the right moving unit includes a bottom wall 303A that is rectangularly shaped, a rear wall 303B extends from the rear edge of the bottom wall 303A, and a side wall 303C extends from the left edge of the bottom wall 303A.

An engaging portion 303A1 is formed, extending laterally, on the left edge at approximately the center thereof in the optical axis direction. The engaging portion 303Al engages the moving shaft 216 (shown in FIG. 9) slidably, i.e., in a manner that is slidable along the shaft in the shaft direction.

The rear wall 303B is provided with a circular hole 303B1 the center of the rear wall 303B. The bottom wall 303A is provided with a bearing 303D at the right edge of the bottom wall 303A, for receiving the guiding shaft 301A (shown in FIG. 12). The side wall 303C is provided with a bearing 303E at the lower part of the side wall 303C, for receiving the guiding shaft 301D (shown in FIG. 13).

Therefore, the right moving unit 303 is movably supported by the bearings 303D and 303E, being guided respectively by guiding shafts 301A and 301D along the optical axis.

As shown in FIG. 13 , a prism unit 306 includes a holder 306A, an intermediating plate 306B, a holder lid 306C, a thin plate 306D, a first prism 306E, a second prism (Dach or roof prism) 306F and so on.

The holder 306A includes an upper and bottom wall 306A1 and 306A2 supporting the upper and bottom surfaces of the first prism 306E and second prism 306F, and a rectangularly shaped rear wall 306A3 connecting the rear edges of the upper wall 306A1 and bottom wall 306A2.

The first prism 306E and the second prism 306F, constituting an erecting prism, are disposed in this order from the objective side, arranged to pass and erect light therethrough. The intermediating plate 306B is disposed between an outcoming plane of the first prism 306E and an incident plane of the second prism 306F, so that the first and second prism 306E and 306F are securely attached to an upper wall 306A1 and a bottom wall 306A2 of the holder 306A (e.g., via an adhesive).

A holder lid 306C includes a front wall 306C1, and a right and left side wall 306C2 and 306C3 extending toward the rear from the right and left edges of the front wall, for connecting the edges of the upper wall 306A1 and the bottom wall 306A2 of the holder 306A1. The front wall 306C1, opposing the incident surface of the first prism 306E, has an opening 306C11 formed therethrough, through which light passes.

The rear wall 306A3 of the holder 306A is also provided with an opening, through which the outcoming light from the second prism 306F passes.

The thin plate 306D is disposed between the rear side of the rear wall 306A3 of the holder 306A and the rear wall 303B of the moving unit 303. In the center of the thin plate 306D, an opening 306D1 is formed for passing light.

The rear wall 306A3 of the holder 306A is provided with two threaded holes 306A31 formed therein, opposing each other across the opening of the hole. Two screws 815 are screw coupled to the two threaded holes 306Aa31 of the rear wall 306A3 of the holder 306A, via spring (or lock) washer 816, washer 817, the through hole 303B2 of the rear wall 303B of the moving unit 303, and the through holes 306D2 of the thin plate 306D, so that the holder 306A is integrally fixed to the moving unit 303.

The rear wall 303B of the moving unit 303 has protrusions 303B3, which extend rearward and in which are formed threaded holes 303B31 in the height direction therethrough.

As shown in FIG. 14, the right eyepiece cylinder 304 includes a bottom wall 304A and an upper wall 304E, as well as a right side wall 304B, a left side wall 304C and a rear wall 304D that extend, respectively from the right edge, left edge and the rear edge of the bottom wall 304A. The upper wall 304E is connected to the upper edges of the right side wall 304B, the left side wall 304C and the rear wall 304Dd.

The front edges of the bottom wall 304A, the right wall 304B and the upper wall 304E are formed to receive the rear wall 303B of the moving unit 303 (shown in FIG. 13), and are provided with respective screw holes 304F. Three screws 818 are screw coupled to the threaded holes 303B31 (shown in FIG. 13) formed on the corresponding protrusions 303B3 of the rear wall 303B through respective through holes 304F, so that the rear wall 303B is securely coupled to the right eyepiece cylinder 304.

Therefore, the right eyepiece cylinder 304, the prism unit 306 and the moving unit 303 are integrally coupled so as to be movable with respect to the right frame 301 and the objective unit 305, guided by the guiding shaft 301A and 301D along the optical axis.

As shown in FIG. 14, two guiding shafts 311 are provided, parallel with each other along the optical axis, between the rear surface of the rear wall 303B of the moving unit 303 (shown in FIG. 13) and the front surface of the rear wall 304D of the right eyepiece cylinder 304 (shown in FIG. 13).

Figure 28B:
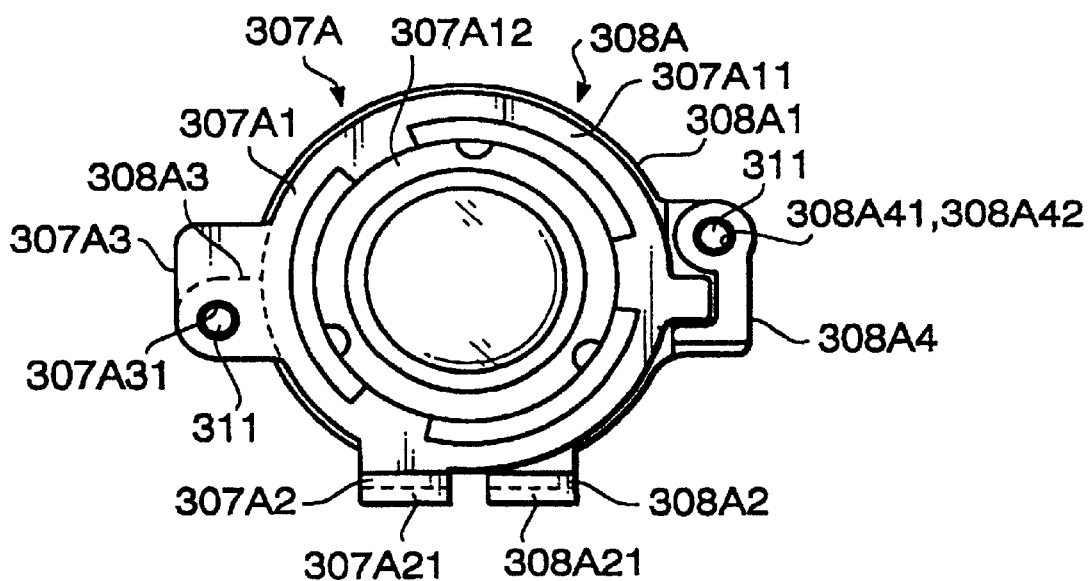

As shown in FIG. 14, the first lens unit 307 includes a first lens frame 307A and a first lens 307B. FIGS. 28A and 28B show a detailed view of the first lens frame 307A and second lens frame 308A.

As shown in FIGS. 14 and 28A, the first lens frame 307A includes a body 307A1 (shaped cylindrically), an engaging arm 307A2 extending frontward from the lower part of the body 307A1, and two shaft holder arms 307A3 and 307A4 extending toward the rear, respectively, from the right and left edges of the body 307.

As shown in FIG. 14, the outer circumference of the first lens 307B is held on the inner circumference of the body 307A1 of the first lens frame 307.

As shown in FIGS. 14, 28A and 28B, an engaging protrusion 307A21 is formed at the lower front end of the engaging arm 307A2 for engaging with the channel groove 213D (shown in FIG. 9) that is provided on the right arm 213B of the first lens slide plate 213. The engaging protrusion 307A21 (shown in FIG. 14) is engaged with the channel groove 213D (shown in FIG. 9)so as to be movable laterally, but immovable along the optical direction.

As shown in FIGS. 14, 28A and 28B, the shaft holder arm 307A3 of the body 307A1 is provided with a shaft hole 307A31 to receive the guiding shaft 311 therethrough. The shaft holder arm 307A4 is provided with a shaft hole 307A41 to receive the guiding shaft 311. The body 307A1 is slidably supported by the guiding shafts 311 in the shaft holes 307A31 and 307A41, slidable along the optical axis.

The second lens unit 308 includes a second lens frame 308A, a second lens pressing ring 308B and a second lens 308C.

The second lens frame 308A includes a body 308A1 (shaped cylindrically), an engaging arm 308A2 extending toward the front from the lower edge of the body 308A1, a shaft holder 308A3 provided at the right edge of the body 308A1, and a shaft holder 308A4 provided at the left edge of the body 308A1.

The inner circumference of the body 308A1 of the second lens frame 308A is formed to hold the outer circumference of the second lens 308C. A female screw (threads) formed on the inner circumference is engaged to the male screw formed around the outer circumference of the pressing ring 308B, so that the second lens 308C is held by the body 308A1 and the second lens pressing ring 308B.

The lower front end of the engaging arm 308A2 includes an engaging protrusion 308A21 formed thereon for engaging the concaved groove 214 (shown in FIG. 9) provided on the left arm 214B of the second lens slide plate 214. The engaging protrusion 308A21 (shown in FIG. 14) is engaged with the channel groove 214D (shown in FIG. 9) so as to be movable laterally, but immovable in the optical direction.

As shown in FIGS. 14, 28A and 28B, a shaft hole 308A31 is formed on the shaft holder 308A3 of the body 308, into which the guiding shaft 311 is inserted. Two shaft holes 308A41 and 308A42 (front and rear) are formed on the shaft holder 308A4, disposed in this order from the objective side, and having a predetermined distance therebetween. The guiding shaft 311 is inserted through each of the shaft holes 308A42 and 308A42. Accordingly, the body 308A1 is slidably held by each guiding shafts 311 inserted into the shaft holders 308A31, 308A41 and 308A42, and is thereby slidable in the optical direction.

As shown in FIG. 14, the eyepiece unit 309 includes an eyepiece lens frame 309A, an eyepiece lens pressing ring 309B, an eyepiece lens (third lens) 309C and an eyepiece 309D.

The inner circumferential surface of the eyepiece lens frame 309A is formed to hold the outer circumferential edge of the third lens 309C. The female thread 309A1, formed around the inner circumference, is screwed by the male thread 309B1 of the outer circumferential edge of the pressing ring 309B, so that the third lens 309C is held between the eyepiece lens frame 309A and the eyepiece lens pressing ring 309B.

The rear wall 304D of the right eyepiece cylinder 304 has through hole formed therein in the length (front to back) direction of the rear wall 304D,through which hole's inner circumference is provided a female thread for providing an attaching portion 3 04D1. A female thread of the attaching portion 304D1 is screwed by the male thread 309A2 formed around the outer circumference of the eyepiece lens frame 309A, so that the eyepiece lens frame 309A is fixed to the attaching portion 304D1.

The upper surface of the bottom wall 304A of the right eyepiece cylinder is provided with a receiving groove 304A1 extending along the optical axis direction, for receiving the rear portion of the engaging arm 307A2 of the first lens frame 307A while permitting movement along the optical axis direction. Additionally, a receiving groove 304A2 is formed on the surface of the upper surface of the bottom wall 304A, extending parallel to and separated by a predetermined distance from the receiving groove 304A1 mentioned above, for receiving the rear portion of the engaging arm 308A2 of the second lens frame 308A while the same is moved moving.

As show n in FIG. 19, the front portion of the engaging arm 307A2 of the first lens frame 307A and the front portion of the engaging arm 308A2 of the second lens frame 308A extend from the front edge of the bottom wall 304Aa of the right eyepiece cylinder 304.

As shown in FIG. 19, the under surface of the bottom wall 303A of the moving unit 303 is provided with guiding grooves 303A2 and 303A3 extending along the optical axis direction. The guiding groove 303A2 guides the front portion of the engaging arm 307A2 of the first lens frame 307A, and the guiding groove 303A3 guides the front portion of the engaging arm 308A2 of the second lens frame 308A.

The engaging arms 3 07A2 and 3 08A2 are movably supported by the moving unit 303 and the right eyepiece cylinder 304, to move along the optical axis.

By moving the first lens frame 307A and the second lens frame 308A to approach to/move away from each other, a magnifying power of the telescope optical system is varied. Here, the telescope optical system includes the objective lens 305C, the prism unit 306, the first lens 307B, the second lens 308C and the third lens 309C.

That is, in this telescope system, the objective lens system includes the objective lens 305C, and the eyepiece lens system includes the first lens 307B, the second lens 308C and the third lens 309C. Moving the first lens 307B to approach to/move away from the second lens 308C in the optical direction varies the magnifying-power of the telescope system.

As noted above, the left and right assemblies have numerous similarities, and in the following description, the description with respect to the right side "300" series should be considered to apply to those numbered elements of the left side "400" series that appear in the drawings, but that have not been specifically described herein by such numbers.

Of course, where those numbered elements of the left side "400" series are specifically described, the elements differ from those of the right side, and the description thereof should be considered. Hereinbelow, the left frame 401 and the left objective frame 405 (of the elements in the left lens barrel 400), which are constituted differently from those of the right lens barrel 300, are described,.

As shown in FIG. 15, the left frame 401 is provided with a holder 401B formed on the rear left portion at the center in the height direction, for holding the rear part of the left guiding shaft 401A, similar to the right frame 301 described above.

A threaded hole 401F is formed on the front left side wall of the left frame 401 substantially at the center of the height direction. A head of a screw 813, screw-coupling into the hole 401F, and the left side wall together hold the front portion of the guiding shaft 401A so that the guiding shaft 401A is supported.

The lower part of the front left side wall of the left frame 401 has a threaded hole 401C formed therein to be screw coupled for fixing the left frame 401 to the left slide plate 110 (shown in Fig, 8; refer to the arrow "D").

A holder 401E is formed on the rear right portion of the left frame 401, at substantially the center in the height direction (refer to arrow "C"), for holding the rear portion of the guiding shaft 401D (FIG. 16).

A threaded hole 401G is formed on the right upper part of the front wall of the left frame 401. A screw 814 screw couples into the screw hole 401G, through the through hole 402A of the left frame lid 402, so that the left lid 402 is attached at the front of the left frame 401. The left lid 402 holds the front of the guiding shaft 401D.

A threaded hole 402B is formed on the front of the left frame lid 402, to which the screw 815 is coupled through the through hole 410A22 provided on the front wall 410A2 of the left outer housing 410,. Accordingly, the front portion of the left frame 401 is fixed to the front wall 410A2 of the left outer housing 410A via the left frame lid 402.

A screw 816 is screwed in to the threaded hole 401I formed above the upper portion of the threaded hole 401F of the left frame 401, through the through hole 410A41 formed on the left side wall 410A4 of the left outer housing 410A. Accordingly, the left side of the left frame 401 is fixed to the left side wall 410A4 of the left outer housing 410A.

A screw 817 is screwed into a threaded hole 401H formed on the rear right wall of the left frame 401, through the through hole provided on the rear wall 410A3 of the left outer housing 410A, so that the rear part of the left frame 401 is fixed to the rear wall 410A3 of the left outer housing 410A.

An upper wall 401J, defined by and connected to the upper portions of the right and left side walls of the left frame 401, is approximately rectangularly shaped. The front left side of the upper wall 401J is provided with a (vertically extending) circular through hole 401K.

Under the circular hole 401K is formed an engaging portion 405A4 formed on the left objective frame 405A, the engaging portion 405A opposing the circular through hole 401K.

As shown in FIG. 16, the left objective frame 405A includes a body 405A1 shaped cylindrically, a first holding member 405A2 provided on the left side of the body 405A, and a second holding member 405A3 provided on the right side of the body 405A1 and extending rearward.

The inner circumferential surface of the body 405A1 is formed to hold the outer circumference of the objective lens 405C, and is female threaded. The male threads formed around the outer circumference of the objective pressing ring 405B are screwed into the female screw, so that the objective lens 405C is held by the body 405A1 and the objective pressing ring 405B.

The first holding member 405A2 is formed to slidably hold the guiding shaft 401A (shown in FIG. 15), i.e., such that the left objective frame 405A is slidable along the axis direction of the guiding shaft 401A. In more detail, the first holding member 405A2 is provided with two holders 405A21 and 405A22 projecting from the left edges of the body 405A1. The holders 405A21 and 405A22 are formed to cover or bracket the outer circumference of the guiding shaft 401A from the top and bottom sides (vertically) The upper holder 405A21 is provided with a threaded through hole 405A211, and the lower holder 405A22 is provided with a threaded hole. The through hole 405A211, when the left objective frame 405 is assembled into the left frame 401, opens upward through an oblong circular hole 401L (refer to FIG. 15).

Accordingly, (before the screw 819 noted below is tightened) the guiding shaft 401A is held by the holders 405A2 land 405A22 so that the first holding member 405A2 is movable along the guiding shaft 401A.

The second holding member 405A3 is provided with a shaft hole 405A31 formed to slidably receive the guiding shaft 401D along its axis direction therein. Accordingly, the second holding member 405A3 is formed to hold the guiding shaft 401D, such that the left objective frame 405A is movable in the axis direction of the guiding shaft 401D.

Thus, the left objective frame 405A is held movably in the optical axis direction by the guiding shafts 401A and 401D disposed parallel to each other.

A screw 819 is screwed into the threaded hole in the holder 405A22 via a through hole 405A211 of the holder 405A21, and the holder 405A21 and 405A22 clamp the guiding shaft 401A, so that the left objective frame 405A is fixed at the position along the optical axis direction , held on the guiding shafts 401A and 401D of the left objective frame 405A.

An engaging portion 405A4 is provided on the upper portion of the left side of the body 405A1 of the left objective frame 405A. The engaging portion 405A4 includes two protrusions 405A41 and 405A42 disposed parallel to each other and extending perpendicular to the optical axis. A channeled adjustment groove is formed, defined by the two protrusions 405A41 and 405A42.

Figure 22:
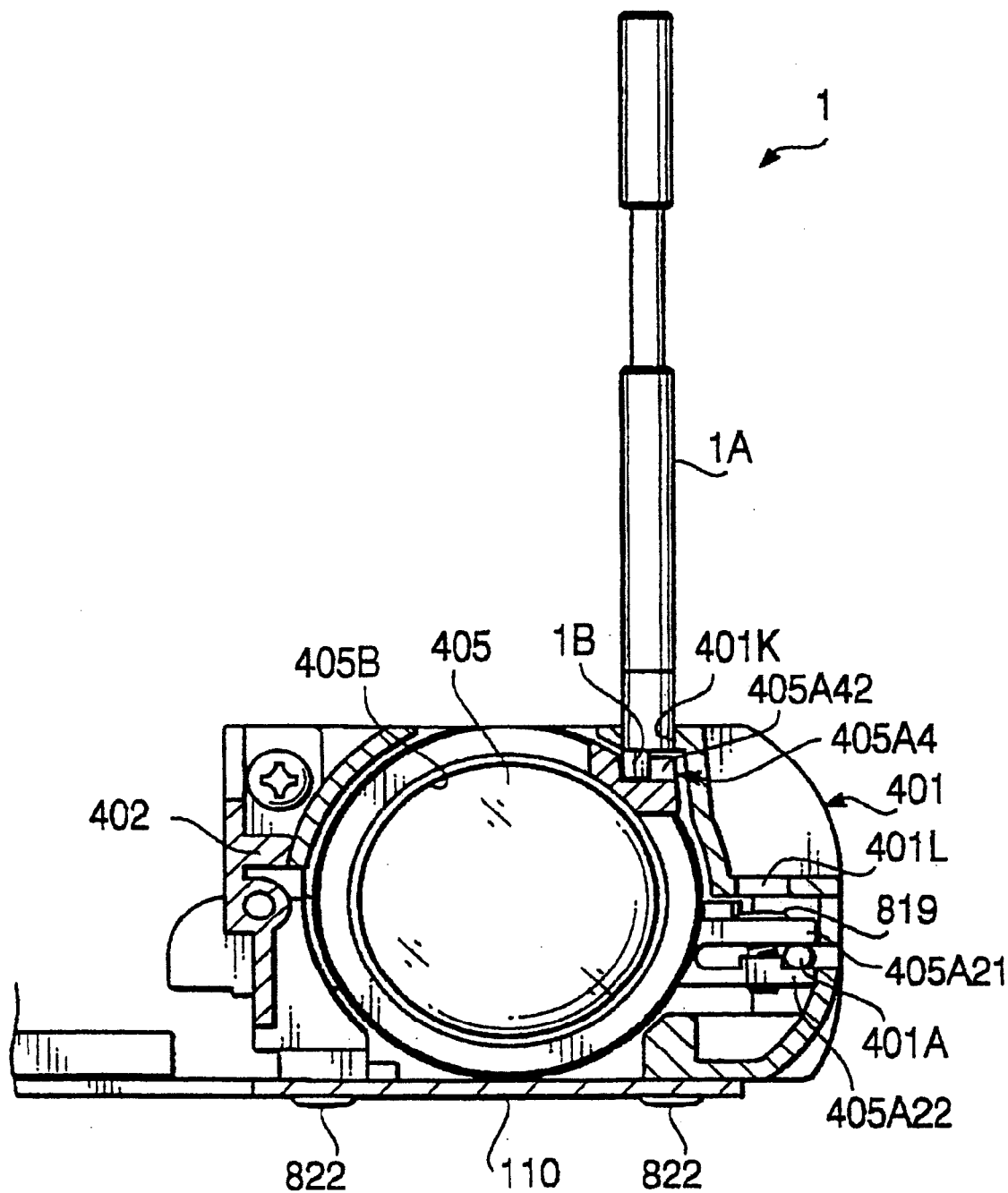
FIG. 22 is an enlarged cross sectional view of the left lens barrel of FIG. 21A, illustrating an operation of a diopter correction on a production/manufacturing or assembly-time stage.

In order to show adjustment of diopter (calibration) during manufacturing or assembly, FIG. 22 illustrates partially sectioned plan view of the left lens barrel. An arrangement jig 1 (which corresponds to a second eccentric member in the claims) is inserted into the circular through hole 401K of the left frame 401 for engaging with the engaging portion 405A4 of the left objective frame. When the arrangement jig 1 is rotated, the left objective frame 405A is moved along the optical axis so that the location of the left objective lens is arranged. This is performed when the screw 819 is not tightened, or before the screw 819 is tightened.

The arrangement jig 1 includes, as shown in FIG. 22, a jig body 1A (corresponding to a jig shaft portion, which is a second shaft portion) having a sectional shape of a circle, and an eccentric portion 1B (corresponding to a jig eccentric portion, which is a second eccentric portion) at the tip of the main body 1A. The eccentric portion 1B is offset to an eccentric position with respect to the shaft of the main body 1A, away from the direction of the center axis of the body 1A. The diameter of the eccentric portion 1B is formed a little smaller than that of the body 1A.

The body A1 is a separate element that is easily insertable into and removable from the circular hole 401K. The outer diameter of the body 1A is slightly smaller than that of the circular hole 401K, so that when the body 1A inserts through the circular hole 401K, while the outer circumference of the body 1A abuts the edge of t he inner circumference of the hole 401K, and is rotated, the body is rotated about the center of the body 1A.

Figure 21A:
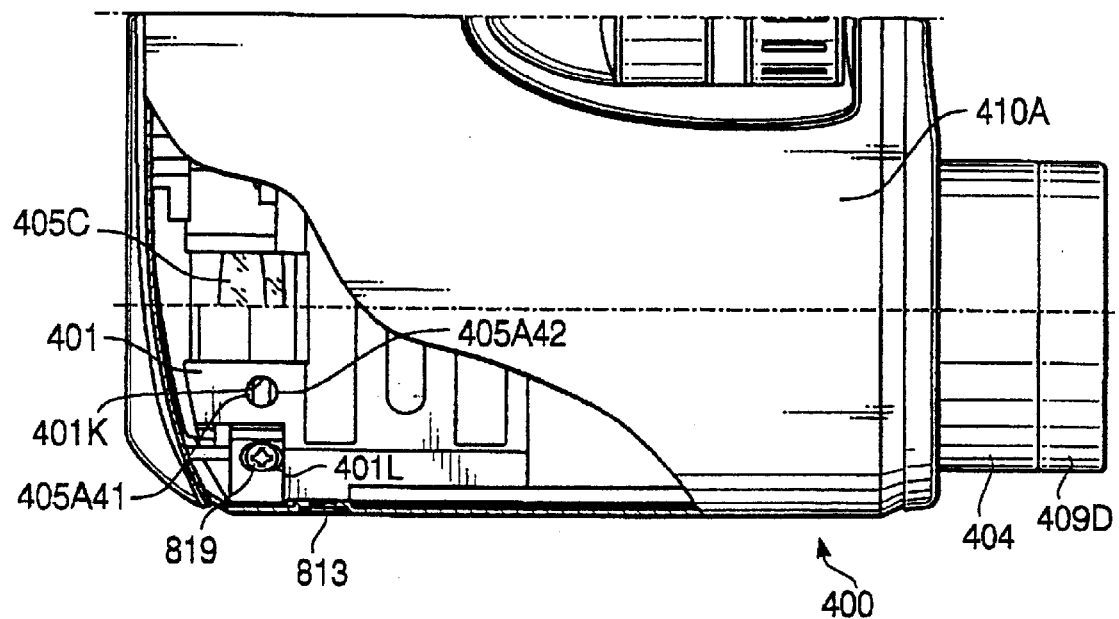
FIG. 21A shows a partially sectioned top plan view of the left lens barrel.
Figure 21B:
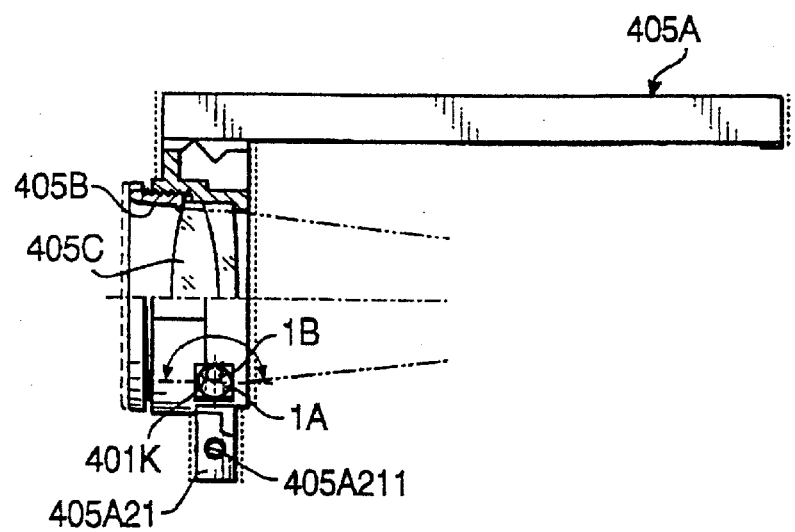
FIG. 21B shows an enlarged cross sectional view of a part of the left lens barrel.

As shown in FIG. 21B, while the body 1A is inserted in the circular hole 401K and the eccentric portion 1B is engaged with the engagement portion 405A4, when the arrangement/calibration jig 1 is rotated, the eccentric portion 1B rotates about the axis of the jig body 1A, resulting in displacing the left objective frame 405A, engaged with the eccentric portion 1B, in the direction of the optical axis.

Next, the arrangement of the objective lens at the production or assembly stage of the binocular, using the calibration or adjustment jig 1, is described.

The left objective lens 405C is arranged in the left lens barrel 400 of the telescope optical system before the outer housing 410A is attached to the left frame 401 at the production stage.

As is detailed below, the diopter of the right objective lens of the right lens barrel 300 can be corrected for variation between an operator's left and right eyes after the binocular is assembled at any time. However, the location of the left objective lens, once corrected at the production or assembly stage, is constructed to be permanently corrected (or at least, not to be readily accessible to the ordinary operator).

First, the diopter of the right telescope optical system is "zeroed" or centered (corrected to zero).

The "zero point"mark 106F of the diopter decorative ring 106 of the diopter decorative ring 106 is aligned to the reference mark 102C (Refer to FIG. 4). By this alignment, the right objective frame 305A is located at the middle point of its adjustable range.

Next, as mentioned above, the arrangement/calibration jig 1 is used to arrange the location of the left objective frame 405A of the left lens barrel 400 along the optical axis direction. The position of the left objective frame 405A is correct when the diopter adjustment of the left and right side are equal to one another (since the user adjustment on the right side is zeroed during the assembly-time adjustment of the left side). This equality can be optically or mechanically measured or determined by an external tool; the manner of such determination is not critical.

Subsequently, the screw 819 (as shown in FIGS. 16, 21, and 22) is screwed and tightened (to a sufficient degree) into the threaded hole of the holder 405A22 of the left objective frame 405A, fixing the left objective frame 405A to the guiding shaft 401A, and fixing the location of the left objective frame 405 with respect to the left frame 401, along the optical direction. Accordingly, the location of the left objective frame 405A with respect to the left frame 401 along the optical axis direction, that is to say the location of the objective lens, is fixed relative to the left frame 401.

At this point, the user diopter adjustment on the right telescope optical system has been zeroed, i.e., in the middle of its adjustable range. Moreover, the diopter adjustment of the left and right sides is equal. Lastly, the assembly-time diopter adjustment of the left telescope optical system is calibrated, complete and fixed at the equal and zeroed position. Accordingly, access by an operator, consumer or user to the assembly-time diopter adjustment may be prevented, specifically by mounting the left outer housing 410A (as shown in FIG. 15) to the left frame 401 and left frame lid 402 via screw 815, 816 and 817. Access to the screws 815 and 817 is prevented and the appearance of the binocular is improved by securing the left rear cover 410B and left front cover 410C via adhesive tape 410D and 410E, respectively.

In the condition mentioned above, the focus of the right and left telescope optical systems are matched so that the full diopter correction range (i.e., from zero to an equal degree in "+" an d"−" directions) of the right lens barrel with respect to the right lens barrel can be effectively assured along the optical direction.

Therefore, the arrangement/adjustment range of the objective lens location in the production or assembly stage is calibrated, set and assured by the left lens barrel of the telescope optical system, while the arrangement or adjustment range of the diopter correction on usual (operator, consumer, or user) operation can be set and assured by the right lens barrel of the telescope optical system. Accordingly, the size of the right and left lens barrel of the telescope optical systems along the axis can be formed smaller, i.e., since the two adjustment ranges are not cumulative in one lens barrel, but are separated between the two lens barrels.

The overall operation of the binocular 1000, configured such mentioned above, is described below.

Figures 2A, 2B:
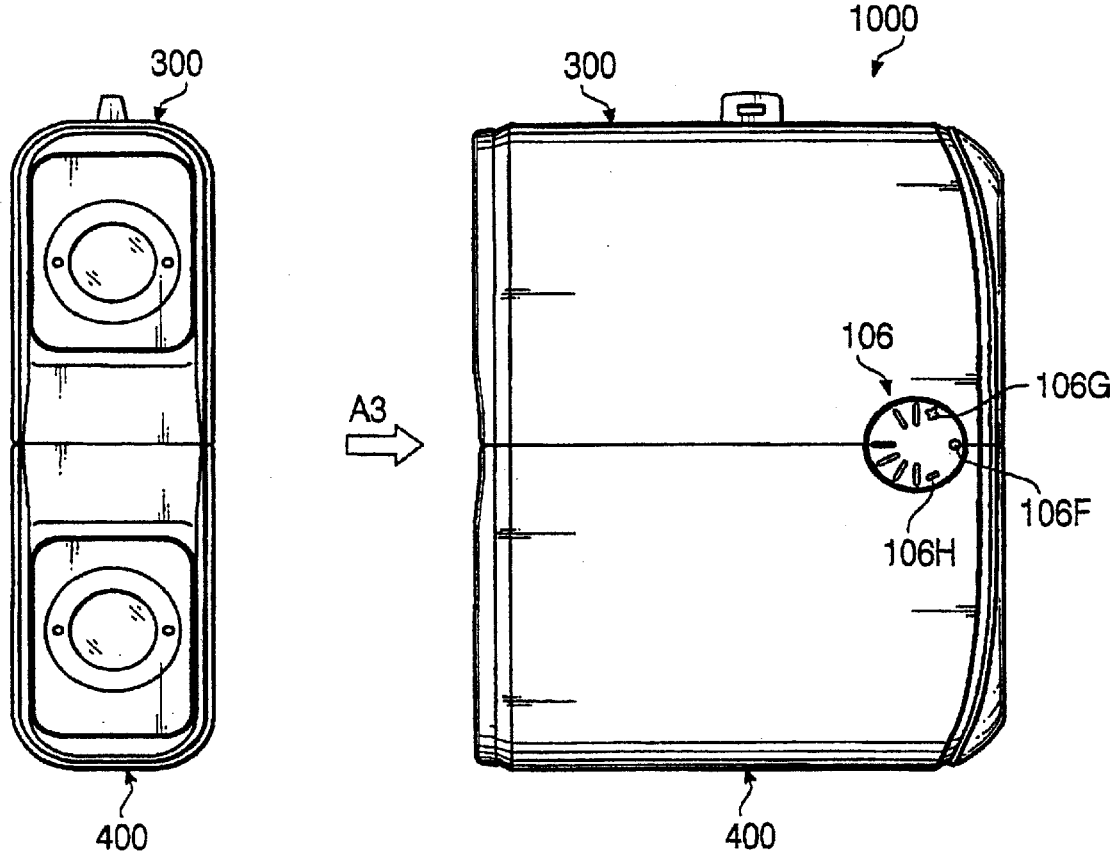
FIG. 2A shows a bottom plan view of the binocular of Fig. 1A.
FIG. 2B shows a rear plan view of FIG. 2A, seen from the direction of an arrow A3, of the binocular at the same configuration with FIG. 1.

The binocular 1000 is, when stored or not used, as illustrated in FIGS. 1 and 2, that is, the right and left lens barrels 300 and 400 are closed and the right and left eyepiece cylinders 304 and 404 are accommodated in the body, or drawn in.

An operator holds the right and left lens barrel 300 and 400 respectively with right and left hands, the thumbs of the right and left hands supporting the right and left outer housing bottoms, and other fingers of right and left hands hold the upper surface of the upper wall of respective right and left outer housing, therefore, holding the outer housing between the fingers and thumbs.

The focus arrangement ring 202 and the zooming arrangement ring 204 are disposed on the main shaft 201, adjacent to each other on the center of the binocular 1000 in the lateral direction, so that any finger (without the use of the thumbs) of the right and left hands can easily rotate the two rings 202 and 204.

When the focus arrangement ring 202 is rotated by a finger, the arm 202A1 integrally formed on the body 202A (shown in FIG. 11), extending in the diameter direction, is also rotated, so that the balls 203 engaged in the engagement portion 202A11 on the arm 202A1 move along the two-stage (coarse and fine) guiding grooves 206A1.

The protrusions 206C4, 206C5 (shown in FIG. 11) formed on the right and left portion of the flange 206C of the moving shaft 206 moved along the guiding grooves 101C11 and 101D11 (shown in FIG. 9) extending along the right and left wall 101c and 101D.

Each protrusion 206C1 and 206C2 abuts the banks 101C12 and 101D12, restricting the range of motion of the moving shaft 206 toward the front, and each protrusion 206C4 and 206C5 abuts the rear wall 101G1 of the body 101, restricting the range of motion to the rear.

As shown in FIG. 11, when the balls 203 move, engaging the first groove 206A11 (wide pitch), the moving amount of the moving shaft 206 by a rotation of the focus rotation ring 202, is larger than that when engaging the second groove 206A12 (narrow pitch).

The moving shaft 206, coupled with the cam frame 210, is integrally attached to the pressing plate 215 (shown in FIG. 9). The pressing plate 215 is further attached integrally with the cooperating shaft 216. Accordingly, cooperating with the movement of the moving shaft 206, the right and left moving units 306 (shown in FIGS. 5 and 13) and 406 (shown in FIG. 16) move rearward. Consequently, the right and left eyepiece cylinders 304 (shown in FIGS. 5 and 14)and 404 (shown in FIGS. 5 and 17) project out the binocular. In such a condition, an operator looks at an object of infinite distance through the both eyepiece 309 and 409 and laterally extends the right and left lens barrels 300 and 400 to set an appropriate inter pupillary adjustment, such that the right and left images coincide for binocular vision.

As mentioned above, the right and left outer housing 310A (shown in FIGS. 5 and 12) are respectively fixed to the right and left slide plates 109 and 110 (shown in FIGS. 6 through 8). Therefore, the right and left lens barrels 300 and 400 move simultaneously and by the same distance in the lateral direction, approaching to and moving away from each other, providing the observer an easy operation for inter pupillary adjustment. Moreover, due to the protrusions 103D extending from bottom lid 103 the slide plate 110 moves laterally with a given frictional force, affording a more comfortable operation feeling for the interpupillary adjustment.

With reference to FIGS. 3, 5, and 6, as well as FIGS. 13 and 14, focus is arranged by rotating the focus arrangement ring 202. That is, the rotation of the focus arrangement ring 202 is converted into a linear movement of the right moving unit 303 (shown in FIG. 13), the right eyepiece cylinder 304 (shown in FIG. 14) and the eye piece unit 309 (shown in FIG. 14) with respect to the right objective frame 305A (shown in FIG. 13).

The prism unit 306 (shown in FIG. 13), the first lens 307 (shown in FIG. 14), the second lens 308 (shown in FIG. 14), and the third lens 309 (shown in Fig. 14) move linearly with respect to the objective lens 305C (shown in FIG. 13), so that the focus is arrangedo r adjusted.

The left lens barrel 400 also has the same operation for focus adjustment, a description of which is accordingly omitted.

Again, with reference to FIGS. 3, 5, and 6, and in detail shown in FIGS. 9–11, 14, 28A and 28B, magnifying-power is varied by rotating the zooming arrangement ring 204. That is, by the rotation of the zooming arrangement ring 204, the main shaft 201 (shown in FIG. 11) rotates, causing the rotation of the cam ring 207 with respect to the cam frame 210. The first lens guiding piece 208 and the second lens guiding piece 209, engaged respectively with the first cam groove 207D and the second cam groove 207E via balls 210B in the cam ring 207, are moved in the opposite direction with each other.

Consequently, the first and second lens frame 307A and 308A (both shown in FIG. 14), being respectively engaged with the first and second lens slide plates 213 and 214 (shown in FIGS. 9 and 10), are moved to approach/move away from each other (always moving in opposite directions) by the same movement of the first and second lens guiding pieces 208, 209. The first and second lens 307B and 308B approach and move away from each other so that the magnifying power of the telescope optical system is varied.

The left lens barrel 400 also has the same operation for zooming adjustment, a description of which is accordingly omitted to.

Next, the operation of the diopter correction will described with reference to FIGS. 18 through 2 0, with some details shown in FIGS. 14 and 17.

First, an observer observes a distant object by the left eye through the third (eyepiece) lens 409C (shown in FIG. 17) of the left lens barrel 400, focusing on the distant object so as to see the distant object most clearly, by rotating the focus arrangement ring 202. Next, observing by the right eye through the third (eyepiece) lens 309C (shown in FIG. 14) of the right lens barrel 300, the observer rotates the diopter decorative ring 106 to see the object most clearly (i. e. , in the + direction toward the position of FIG. 19, or in the "–" direction toward the position of FIG. 20).

That is, rotating movement of the diopter correction decorative ring 106, causing rotation of the diopter eccentric seat 107, is converted to linear motion by engagement of the eccentrically seated (or mounted) disk-shaped body 107A and the channeled adjustment groove formed by the engaging walls 305A41, 305A41, so that the location of the objective lens 305 is arranged with respect to the right frame 301 for diopter correction.

If the observer is the same upon subsequent uses of the binocular 1000, there is no need to change the diopter after the user's initial correction. However, each operator can adjust for variation between that operator's left and right eyes.

The diopter correction decorative ring 106 is disposed on the center in the width direction near to the front end of the supporting plate 102, so that the thumb of either the right and left hands can easily operate the diopter decorative ring 106 to rotate. Moreover, the thumb is already at, or is easily moved to, a sufficient distance, while the observer is focusing or zooming, from the diopter correction decorative ring 106, so that unintentional diopter operation by the thumb is prevented.

In the binocular according to the present invention, the first optical system and the second optical system are selected respectively as the objective optical system and the eyepiece optical system. However, the first optical system and the second optical system can be respectively selected inversely as the eyepiece optical system and the objective optical system. That is, the adjusting mechanisms, in one embodiment eccentric mechanisms, may also be provided in a similar manner to the eyepiece optical system. Moreover, the first optical system may well be selected from a plurality of optical systems that constitute a portion of the objective and eyepiece optical systems. That is, the adjusting mechanisms, in one embodiment eccentric mechanisms, may also be provided in a similar manner to optical systems which share parts among the objective and eyepiece optical systems The binocular according to the present invention, with such a structure detailed above, provides beneficial effects at least as follows.

The diopter correction of the two telescope optical systems for the different diopters of an observer's left and right eyes in the usual (operator, consumer, or user) operation, is corrected by one optical system of the two (left and right) optical systems of a binocular. However, the diopter correction for a fine adjustment/calibration in a manufacturing process is operated by an optical system of the remaining telescope optical system.

Therefore, the first optical system (in the embodiment, an optical lens) provides a correction range for the usual operation, on the other hand, the other (remaining) telescope optical system offers the range for fine adjustment for the first optical system on production process.

Accordingly, one optical system out of the two need not provide the displacement of the optical system for diopter correction both for the usual operation and the fine adjustment in the production process, so that the size of the binocular in the optical direction can be made smaller. In the binocular according to the present invention, with such a structure, the size along the optical axis can be shortened.

In a binocular according to an embodiment of the present invention, the left optical frame 405A includes one diopter correction structure (to be operated, in the embodiment, by an arrangement jig), while the diopter decorative ring 106, the diopter correction eccentric seat 107 and the right objective frame 305A constitute the other diopter correction structure. It should be noted that the arrangement jig is not absolutely necessary to provide an eccentric structure for the calibration arrangement; e.g., an additional part having an offset small diameter boss on one side and a slot or other receptacle for a screwdriver on the other, integrated into the adjustment of the left optical frame 405A, would enable an ordinary screwdriver to be used as a jig. However, the use of the jig disclosed herein has the benefit of preventing or discouraging recalibration by unauthorized persons. The right frame 301 and the left frame 401 constitute supporting members in the claims, and the outer housing 410 constitutes an outer housing member in the claims.

The objective lens 305C, 405C and the objective frame 305A, 405A constitute a first optical system, and the prism unit 306, 406, the first lens unit 307, the second lens unit 309, and the eyepiece lens unit 409 constitute a second optical system.

Although the above description sets forth particular embodiments of the present invention, modifications of the invention will be readily apparent to those skilled in the art, and the inventors expressly intend that the scope of the invention, as well as elements necessary for the invention to function, be determined solely by the appended claims. Changes may be made, within the purview of the appended claims, as originally submitted and as amended, without departing from the scope and spirit of the invention in its aspects. No one or more of the preceding described elements is critical to the operation of the invention, except as explicitly described herein. Although the invention has been described with reference to particular means, materials and embodiments, the inventors do not intend that the invention is to be limited to the particulars disclosed; rather, the invention extends to all equivalent and/or insubstantially different structures, methods and uses such as are within the scope of the appended claims, as originally submitted and as amended.

The present disclosure relates to subject matter contained in Japanese Patent Application No. 2000-063134, filed on Mar. 8, 2000, which is expressly incorporated herein by reference in its entirety.

What is claimed is:

1. A binocular, comprising:

an outer body housing;

two parallel telescope optical systems, each of said two telescope optical systems having an optical axis and a plurality of optical systems arranged along said optical axis, each of said two telescope optical systems including a first optical system in which a portion of said plurality of optical systems are moved along said optical axis for diopter correction; and two diopter correction structures for diopter correction, one of said diopter correction structures being separately and independently provided in each of said two telescope optical systems, each said diopter correction structure moving a corresponding first optical system along said optical axis direction, wherein only one of said diopter correction structures includes a manually operable member exposed outward of said outer body housing of said binocular that is operable by an operator for diopter correction.

2. The binocular according to claim 1, wherein said corresponding first optical system of a remaining one of said diopter correction structures is fixed along said respective optical axis after diopter correction is finished.

3. The binocular according to claim 1, wherein each of said two telescope optical systems includes a second optical system independent from said first optical system, said second optical systems of said two telescope optical systems moving together along said optical axis for focusing.

4. The binocular according to claim 3, wherein said first optical system is an objective optical system, and said second optical system is an eyepiece optical system.

5. The binocular according to claim 1, wherein said only one of said diopter correction structures comprises a first eccentric member, said first eccentric member integrally comprising:

a first shaft portion; and a first eccentric portion, eccentric to said first shaft portion, said first eccentric member being rotatable about the axis of said first shaft portion, and engaging said corresponding first optical system, wherein said corresponding first optical system is moved along said optical axis direction while engaging said first eccentric member by the eccentric rotation of said first eccentric member about the axis of said first shaft portion.

6. The binocular according to claim 5, wherein, said operable member includes said first eccentric member.

7. The binocular according to claim 1, where in a remaining one of said diopter correction structures comprising:

an adjustment channel operatively connected to a corresponding first optical system; and a wall with a shaft receiving hole facing said adjustment channel, said shaft receiving being adapted to receive an adjustment jig, said adjustment jig comprising:

a jig shaft portion; and a jig eccentric portion, eccentric to said jig shaft portion, said jig eccentric member being rotatable about an axis of said jig shaft portion, and being engaged said adjustment channel, said corresponding first optical system being moved along said optical axis direction while said adjustment jig is rotated by the eccentric rotation of said jig eccentric member about the axis of said jig shaft portion and said shaft receiving hole.

8. The binocular according to the claim 7, comprising:
a supporting member, movably supporting said first optical system of said remaining one of said telescope optical systems along said optical axis direction, wherein
said shaft receiving hole is provided in said supporting member to rotatably support said jig shaft portion, and said jig eccentric member is rotated while said jig shaft portion being supported in said shaft receiving hole.

9. The binocular according to the claim 8, wherein said jig shaft portion of said jig eccentric member is removable from said jig receiving hole.

* * * * *